(12) United States Patent
Barad et al.

(10) Patent No.: US 8,782,037 B1
(45) Date of Patent: Jul. 15, 2014

(54) SYSTEM AND METHOD FOR MARK-UP LANGUAGE DOCUMENT RANK ANALYSIS

(75) Inventors: Haim Barad, Zichron Yaakov (IL); Jonathan Skelker, Zichron Yaakov (IL); Marina Grechuhin, Ganei Tikva (IL)

(73) Assignee: Remeztech Ltd., Zichron Yaakov (IL)

(*) Notice: Subject to any disclaimer, the term of this patent is extended or adjusted under 35 U.S.C. 154(b) by 178 days.

(21) Appl. No.: 13/163,726

(22) Filed: Jun. 20, 2011

Related U.S. Application Data

(60) Provisional application No. 61/356,607, filed on Jun. 20, 2010, provisional application No. 61/394,350, filed on Oct. 19, 2010.

(51) Int. Cl.
  *G06F 17/30* (2006.01)
(52) U.S. Cl.
  CPC .................. *G06F 17/30864* (2013.01)
  USPC ...................................................... 707/723
(58) Field of Classification Search
  CPC .................. G06F 17/3053; G06F 17/30864
  USPC ........................................ 707/706, 770, 723
  See application file for complete search history.

(56) References Cited

U.S. PATENT DOCUMENTS

| | | | |
|---|---|---|---|
| 8,024,336 B2 | 9/2011 | Wai | |
| 8,285,702 B2 | 10/2012 | Carmel et al. | |
| 2002/0078045 A1* | 6/2002 | Dutta | 707/7 |
| 2005/0177455 A1* | 8/2005 | De Lury et al. | 705/26 |
| 2006/0173822 A1 | 8/2006 | Watson et al. | |
| 2006/0247914 A1 | 11/2006 | Brener et al. | |
| 2006/0253345 A1 | 11/2006 | Heber | |
| 2007/0106651 A1* | 5/2007 | Isaacson et al. | 707/3 |
| 2008/0010142 A1 | 1/2008 | O'Brien et al. | |
| 2010/0057717 A1* | 3/2010 | Kulkarni | 707/5 |
| 2010/0312786 A1 | 12/2010 | Wai | |
| 2011/0270603 A1 | 11/2011 | Ovil et al. | |

\* cited by examiner

*Primary Examiner* — Thu-Nguyet Le
(74) *Attorney, Agent, or Firm* — Graeser Associates International Inc; Dvorah Graeser

(57) ABSTRACT

A system and method for mark-up language document rank analysis that may be performed automatically and that may also determine one or more differences between mark-up language documents with regard to their relative rank.

37 Claims, 18 Drawing Sheets

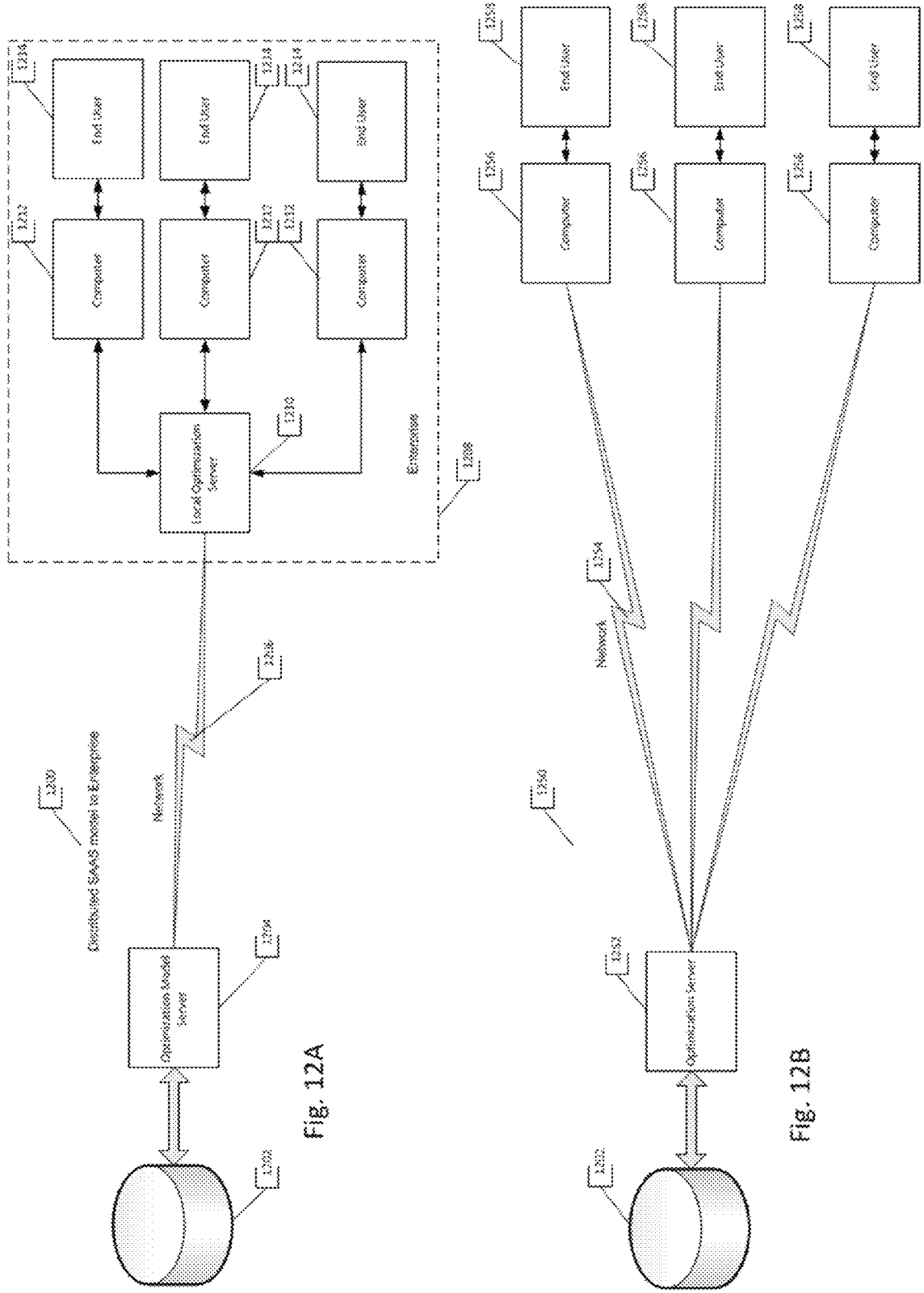

SYSTEM AND METHOD FOR MARK-UP LANGUAGE DOCUMENT RANK ANALYSIS

This Application claims priority from US Provisional Application No. 61/356,607, filed on Jun. 20, 2010, and from US Provisional Application No. 61/394,350, filed on Oct. 19, 2010, both of which are hereby incorporated by reference as if fully set forth herein.

FIELD OF THE INVENTION

The present invention is of a system and method for mark-up language document rank analysis, and in particular but not exclusively, to such a system and method that is useful for determining one or more differences between mark-up language documents with regard to their relative rank.

BACKGROUND OF THE INVENTION

Search engines play important roles for supporting user interactions with the Internet. Search engines often act as a "gateway" to the Internet for many users, who use them to locate information of interest as a first resource. They are practically indispensable for negotiating the many thousands of web pages that form the World Wide Web.

Many users typically review only the first page or first few pages of search results that are provided by a search engine. For this reason, owners of web sites alter their web pages to increase their rank, whether by making the pages more "friendly" to spiders or by altering content, layout, tags and so forth. This process of changing a web page to increase its rank is known as SEO or "search engine optimization".

Currently search engine optimization is typically performed manually. Search engines carefully guard their rules and algorithms for determining rank, both against competitors and also to avoid "spam" web pages which do not provide useful content but which seek only to have a high ranking, for example to attract advertisers. However, manual analysis and adjustments are highly limited and may miss many important improvements to web pages that could raise their rank in search engine results.

SUMMARY OF AT LEAST SOME ASPECTS OF THE INVENTION

The background art does not teach or suggest a system and method for mark-up language document rank analysis that may be performed automatically and that may also determine one or more differences between mark-up language documents with regard to their relative rank.

The present invention overcomes these drawbacks of the background art by providing, in at least some embodiments, a system and method for mark-up language document rank analysis that may be performed automatically and that may also determine one or more differences between mark-up language documents with regard to their relative rank.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer" on a "computer network", it should be noted that optionally any device featuring a data processor and the ability to execute one or more instructions may be described as a computer, including but not limited to any type of personal computer (PC), a server, a cellular telephone, an IP telephone, a smart phone, a PDA (personal digital assistant), or a pager. Any two or more of such devices in communication with each other may optionally comprise a "computer network".

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A shows the operation of an analysis subsystem according to at least some embodiments of the present invention, which may optionally relate to the analysis subsystem of FIG. 1, in more detail, while

FIG. 12 shows three exemplary, illustrative systems for delivery of optimization guidance and feedback according to at least some embodiments of the present invention: FIG. 12A relates to a distributed SAAS (software as service) model for an enterprise; FIG. 12B relates to a distributed SAAS (software as service) model for individual users.

DESCRIPTION OF THE PREFERRED EMBODIMENTS

The present invention is, in at least some embodiments, of a system and method for mark-up language document rank analysis that may be performed automatically and that may also determine one or more differences between mark-up language documents with regard to their relative rank.

Figure 1:
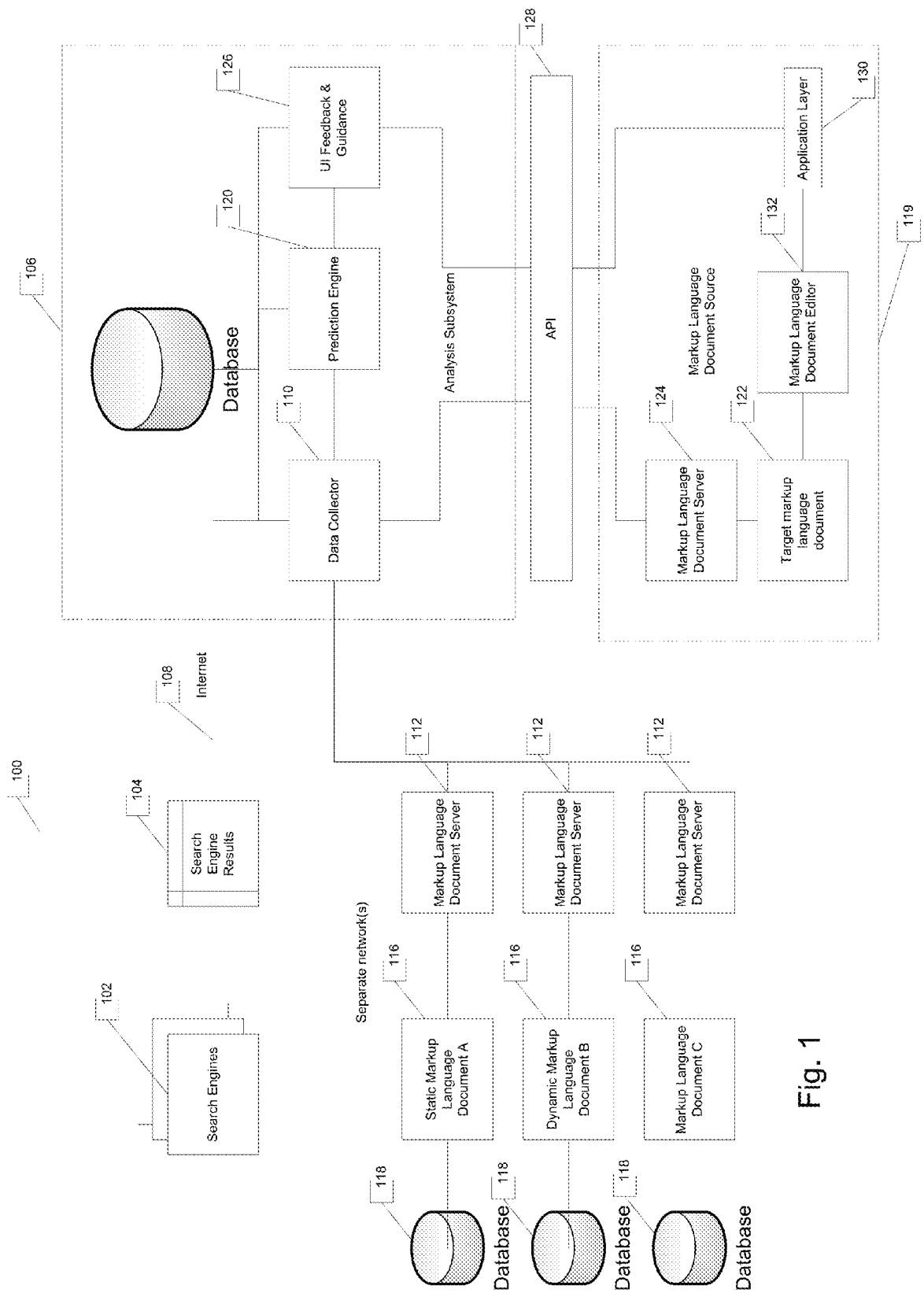
FIG. 1 shows an exemplary, illustrative non-limiting system according to some embodiments of the present invention.

Referring now to the drawings, FIG. 1 shows an exemplary, illustrative non-limiting system according to some embodiments of the present invention. As shown, a system 100 features a plurality of search engines 102 as non-limiting examples of computer network based indexing programs for indexing mark-up language documents, which are preferably internet based indexing computer programs for indexing such mark-up language documents. Such programs assist users to locate content based upon one or more parameters such as keyword searches for example, typically by using indexes of mark-up language documents such as web pages for example. Typically search engines 102 return a plurality of mark-up language document results by returning a plurality of links to such documents to a computer of the requestor of the search, such as for example a plurality of URLs. Search engines 102 are shown in FIG. 1 as returning a plurality of search results 104 to an analysis subsystem 106 through a computer network 108, which may optionally be the internet for example. Analysis subsystem 106 is typically operated by one computer or a plurality of computers, and/or through distributed computing, as non-limiting examples.

Analysis subsystem 106 optionally and preferably receives such search results 104 in response to a query, which is preferably formatted as for any search engine query (for example, containing one or more keywords). The query is preferably generated and transmitted by a data collector 110, which also receives search results 104.

Data collector 110 also preferably obtains the mark-up language documents associated with search results 104, for example by downloading such documents from a server. As non-limiting examples, data collector 110 is shown as being in communication with a plurality of mark-up language document servers 112 through a computer network 114, which may optionally also be the Internet and/or otherwise the same computer network as computer network 108. Data collector 110 preferably receives one or more mark-up language documents 116 according to the search results 104, for example according to a URL or other address for a particular mark-up language document server 112, which is supplied with search results 104. Data collector 110 may optionally retrieve or "pull" a mark-up language document 116 or alternatively may have such a mark-up language document 116 "pushed" or sent to data collector 110.

Each mark-up language document server 112 is shown as providing a different type of mark-up language document 116 (although of course each server 112 may or may not be limited to a particular type of mark-up language document 116), with non-limiting examples including a static mark-up language document A 116, a dynamic mark-up language document B 116 or a mark-up language document C 116. Each mark-up language document server 112 optionally retrieves each such mark-up language document 116 from a database 118 as shown.

Data collector 110 then preferably passes these results and one or more of the above described mark-up language documents 116 to a prediction engine 120, which as shown is also part of analysis subsystem 106. As described in greater detail below, prediction engine 120 then analyzes the received search results 104 and also the corresponding mark-up language documents 116 with regard to the relative ranking of a plurality of mark-up language documents 116, and also by comparing one or more features within the plurality of mark-up language documents 116 according to their relative rank.

Additionally or alternatively, prediction engine 120 may also optionally compare one or more features of a target mark-up language document 122 to such one or more features in mark-up language documents 116, with regard to a relative rank of target mark-up language document 122 in comparison to mark-up language documents 116, as determined in search results 104.

Target mark-up language document 122 is preferably provided by a target mark-up language document source 119, which preferably comprises a target mark-up language document server 124. Target mark-up language document server 124 is preferably in communication with data collector 110, preferably through an API (application programming interface) 128, and also optionally through any computer network 106 as previously described (alternatively, target mark-up language document server 124 may optionally be in direct communication with data collector 110, for example through an internal network and/or as part of a particular computational hardware installation). Data collector 110 may optionally "pull" target mark-up language document 122 from target mark-up language document server 124 or alternatively may have target mark-up language document 122 "pushed" by target mark-up language document server 124.

The comparative analysis of target mark-up language document 122 with regard to mark-up language documents 116 is described in greater detail below, but preferably includes determining at least one difference between target mark-up language document 122 and mark-up language documents 116 with regard to relative rank. Optionally such a difference could for example explain a relatively lower rank of target mark-up language document 122 with regard to one or more mark-up language documents 116.

The results of the analysis may optionally be adjusted according to feedback from a user, which provided through a UI feedback and guidance module 126.

Analysis subsystem 106 is optionally in communication with one or more additional external computers or systems, which is preferably performed through one or more APIs (application programming interfaces) 128. In this exemplary system 100, API 128 supports communication between UI feedback and guidance module 126 and an application layer 130, which for example may optionally support a user interface (UI, not shown) for communication with UI feedback and guidance module 126.

Target mark-up language document source 119 also preferably features a mark-up language document editor 132, which may either optionally perform one or changes on target mark-up language document 122 automatically or alternatively (or additionally) according to one or more user inputs, for example through application layer 130. For example, UI feedback and guidance module 126 may also optionally provide inputs as to one or more proposed changes to target mark-up language document 122 to increase the relative rank of target mark-up language document 122 with regard to the plurality of mark-up language documents 112 obtained in the search results. Such inputs are preferably provided to application layer 130, whether for user approval or for automatic implementation by mark-up language document editor 132.

Alternatively or additionally, the user may perform one or more changes to target mark-up language document 122, whether through application layer 130 or directly through mark-up language document editor 132, after which the changed document is reanalyzed by prediction engine 120, to see whether the expected relative rank would be higher or lower, as described in greater detail below.

Figure 2A:
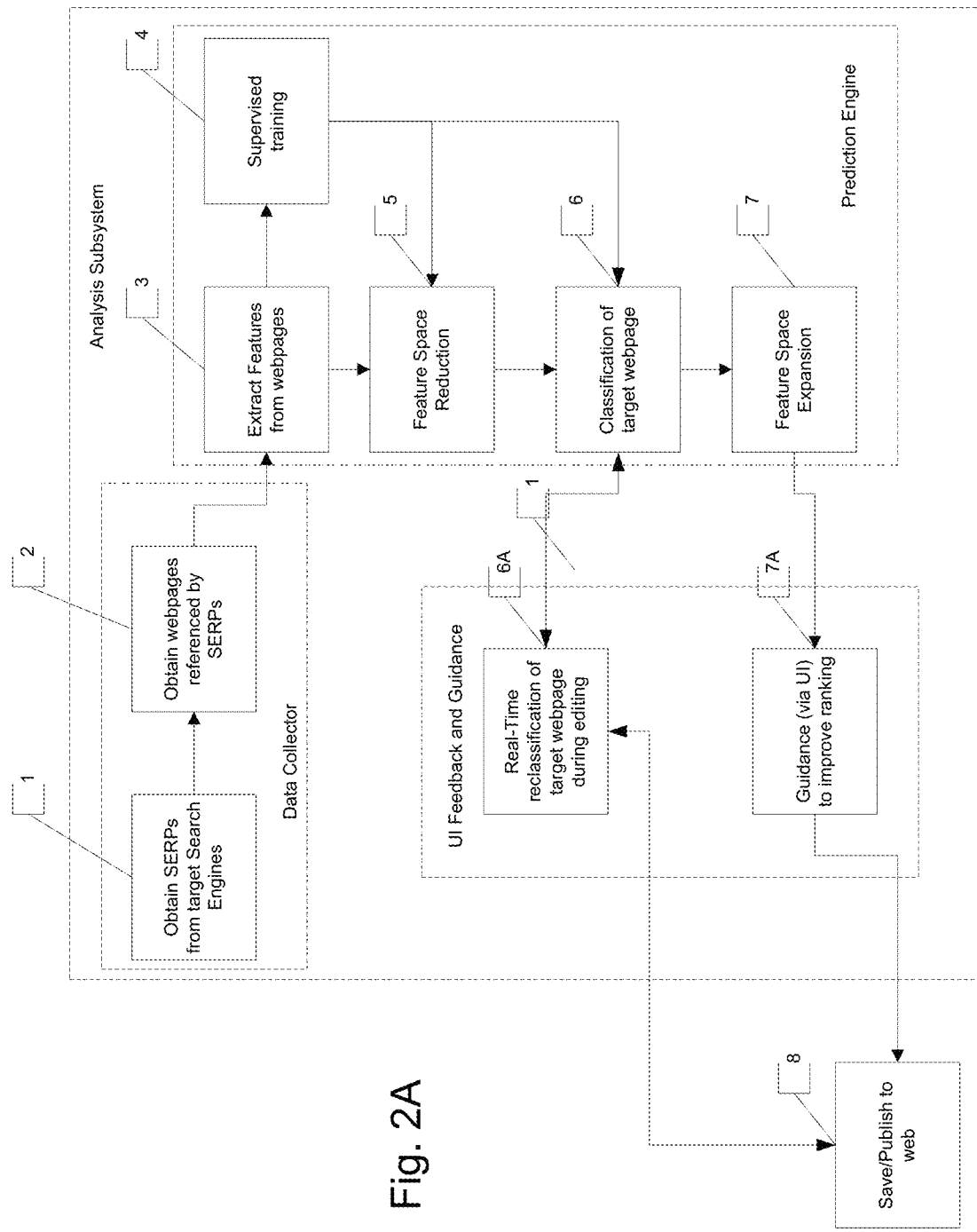

FIG. 2A shows the operation of an analysis subsystem according to at least some embodiments of the present invention, which may optionally relate to the analysis subsystem of FIG. 1, in more detail. As shown, in stage 1, data collector obtains the search results from one or more search engines. In stage 2, data collector obtains the mark-up language document pages, such as web pages for example, according to the search results; for example and without limitation, the search results may include URLs or other address information for the mark-up language documents. For this exemplary method and without wishing to be limited, the description will relate to web pages as the mark-up language documents.

Stages 3-7 are then performed by the prediction engine. In stage 3, the prediction engine extracts one or more features from the web pages as described in greater detail below. In stage 4, the prediction engine preferably performs supervised training of an analysis algorithm with regard to such features.

Supervised training is a machine learning methodology whereby examples from a known set of classes are fed into a system with the class identifiers. Often the input samples are in the form of an N-dimensional feature vectors. The system is trained with these samples and class identifiers and the resultant model is called a classifier.

Ideally, the classifier should be able to classify the entire training set (now without the given class identifiers) correctly. The entire process of learning from a set of sample feature vectors is called "training the classifier".

Once training is complete, the classifier is then used to classify unlabeled data into classes. This can be done through a variety of methods that typically rely on determining relative similarities between classes (as determined during training) and the new input vectors.

Figure 2B:
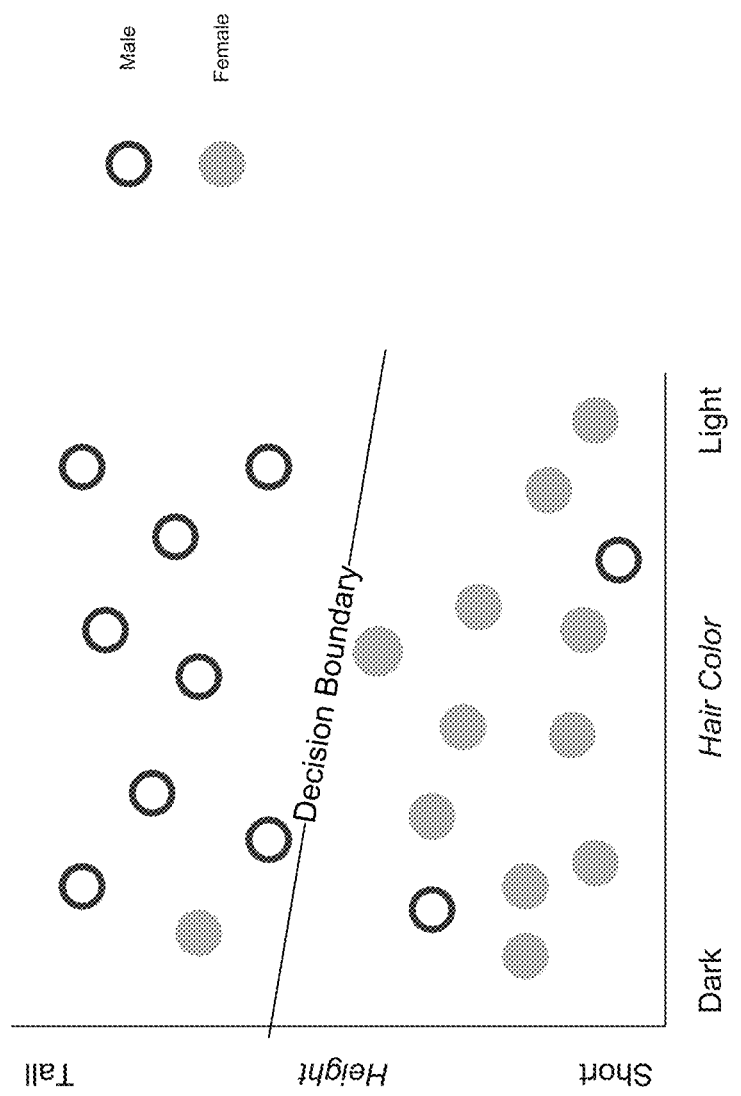
FIG. 2B shows an exemplary decision boundary in an exemplary two dimensional feature space.

A simple example of supervised training is the ability to distinguish between males and females based on just two features. The first feature is height and the second feature is hair color. Clearly from a priori knowledge, it is known that height is more likely to be a usefully distinguishing feature than is hair color. The process starts by obtaining training samples from a selected and known training set of male and female participants. A feature vector (2-dimensional) is extracted from each of the training samples and plotted in a two-dimensional feature space, with one dimension for each feature. As seen from the example (FIG. 2b), the male population tends to be taller (that is, the male and female populations may be more accurately separated by height) and a decision boundary is calculated for the feature of "height".

While the separation between the two classes is not 100% accurate, it is possible to classify new samples with reasonable accuracy. For greater accuracy, it would be necessary to enhance the classifier by adding new features. In any case, the classifier can be used now to classify unknown samples based on the calculated decision boundary.

The main advantage of supervised training is the construction of the classifier is often more accurate and reliable than for unsupervised training, because the training set had a known set of class identifiers. For the presently described method, it is possible to leverage supervised training methods because the search engines provide the rankings in the Search Engine Result Pages. The supervised training is not limited to training by search engine rankings but may instead optionally include other classification information for training purposes.

In stage 5, the prediction engine optionally performs feature space reduction, to locate one or more features considered to be of particular importance in determining the relative rank of the target after the supervised training. Therefore, subsequent stages may optionally be performed with fewer features. Non-limiting examples of algorithms for feature space reduction include PCA (principle component analysis).

In stage 6, the prediction engine classifies the target web page according to the N dimensional feature space and according to the respective decision boundary for each feature. Optionally one or more features are weighted with regard to its respective decision boundary such that in cases where the classification of the target web page with regard to that feature is not clear, the decision may optionally be weighted toward a particular side of the boundary. In stage 7 the prediction engine then performs feature space expansion in which the engine determines which features have the most effect on altering the rank of the target web page with regard to the other ranked web pages.

Optionally stages 5 and 6 are not performed, for example if the method is not to be performed in real time, in which case the method optionally proceeds from stage 4 directly to stage 6A as described below.

From stage 6 the process may also optionally be performed by the UI feedback and guidance module in stage 6A, which may optionally perform real time reclassification of the target web page according to input through the web page editor. Also from stage 7, the process may also optionally be performed by the UI feedback and guidance module in stage 7A, which may optionally provide guidance to the user (or to an automated web page editor) with regard to whether one or more changes are likely to improve or reduce the rank of the web page with regard to the other analyzed web pages.

In stage 8, optionally such information is provided to the user and/or through the web; for example, optionally the altered webpage is published to the Internet by being uploaded to a web server.

Figure 3:
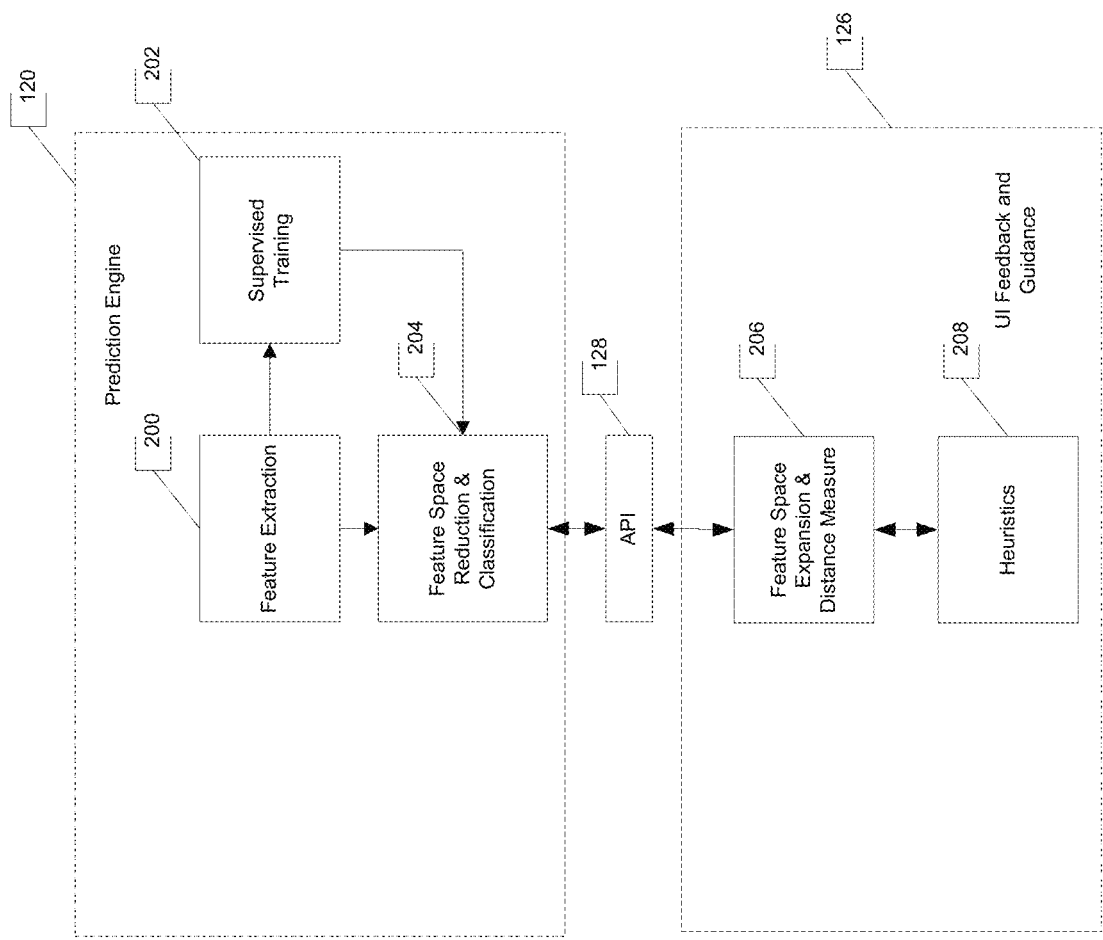
FIG. 3 shows an exemplary, illustrative, non-limiting embodiment of a prediction engine and a UI feedback and guidance module, for example as shown in FIG. 1.

FIG. 3 shows an exemplary, illustrative, non-limiting embodiment of a prediction engine and a UI feedback and guidance module, for example as shown in FIG. 1. As shown, prediction engine 120 features a feature extraction module 200, for performing feature extraction as previously described, preferably on both the received web pages from the search engine results and also on the target web page. Feature extraction module 200 communicates with supervised training module 202, which performs supervised training with regard to the extracted features (and also with regard to the relative ranking of the received web pages). For example, the supervised training may optionally result in a particular feature being determined as inducing an increased rank or a decreased rank of a web page. Also as previously noted, the supervised training preferably also enables decision boundaries to be placed with regard to whether the presence of a feature is more likely to increase or decrease the relative rank of a web page.

Both feature extraction module 200 and supervised training module 202 preferably communicate with a feature space reduction and classification module 204. Feature space reduction and classification module 204 is optionally provided to increase the rapidity of calculations, by reducing the number of features initially considered for classifying the target web page with regard to its relative rank in the search results. Feature space reduction and classification module 204 also classifies the target web page with regard to the results determined through supervised training from supervised training module 202 and also according to the features extracted by feature extraction module 200.

The classification of the target web page according to the reduced features is then passed from prediction engine 120 to UI feedback and guidance module 126 through API 128 as previously described. Within UI feedback and guidance module 126, a feature space expansion and distance measure module 206 preferably first expands the feature space again to the full set of features that provide the best discrimination in terms of classification, and the calculates a distance between the target web page and the received web pages from the search engine results.

In addition, feature space expansion and distance measure module 206 may perform feature space expansion to determine which features have the most effect on altering the rank of the target web page with regard to the other ranked web pages. A heuristics module 208 may also optionally be used to provide guidance to the above process through one or more heuristically determined rules.

Also, feature space expansion and distance measure module 206 may determine the distance measure for a target web page that has been altered, to determine the potential effect of such alteration on the relative rank of the target web page within a set of received, ranked web pages (i.e. the search engine results).

Figure 4:
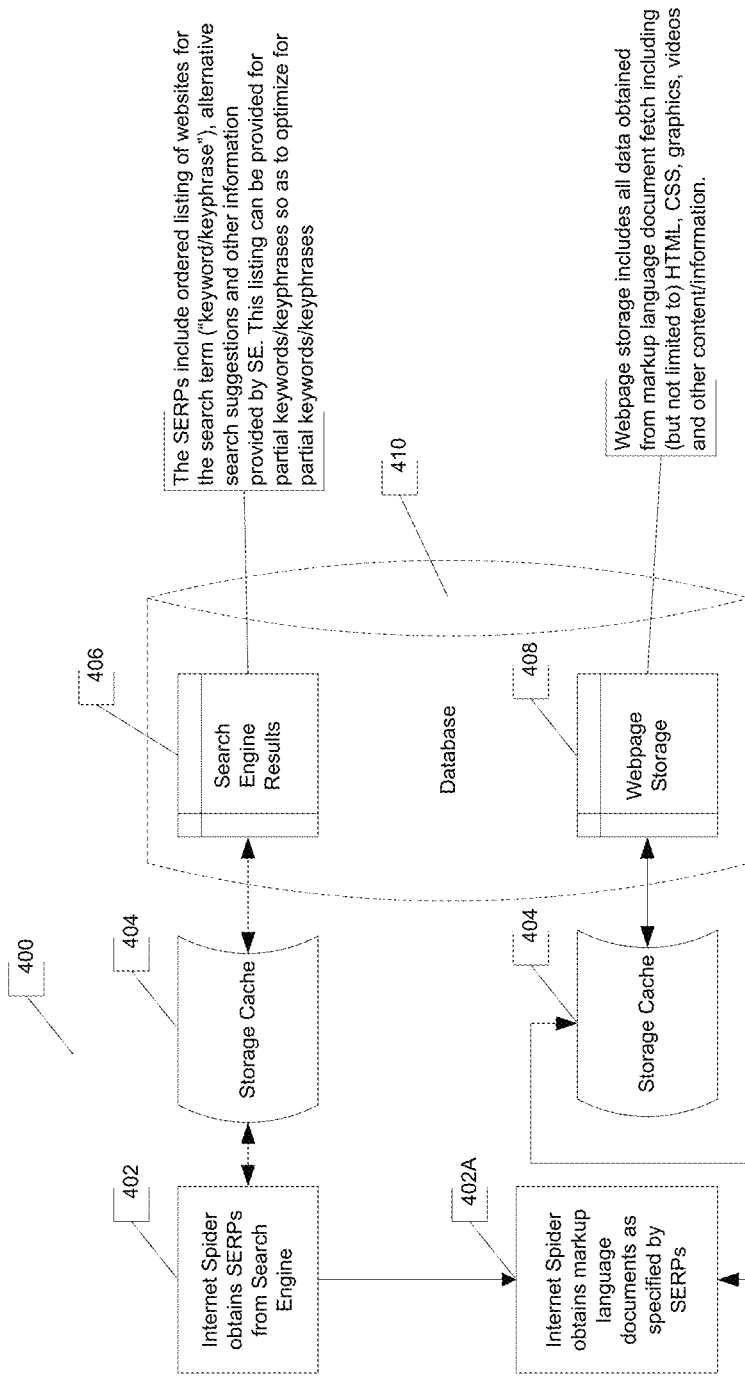
FIG. 4 shows an exemplary, non-limiting flow process for use of an internet "spider" for obtaining the mark-up language documents according to the search results from the search engine(s) as described with regard to FIG. 1.

FIG. 4 shows an exemplary, non-limiting flow process for use of an internet "spider" for obtaining the mark-up language documents according to the search results from the search engine(s) as described with regard to FIG. 1. As shown, a process 400 includes obtaining SERPs (search engine results page) from a search engine by a spider (402). The SERPs include a ranked listing of websites (or other mark-up language document sources0 for the search term (such as a keyword, which may optionally be a phrase0, alternative search suggestions and other information provided by the search engine. Optionally, the ranked listing may be provided for partial keywords so as to optimize for them as well, in addition to optimizing for full keywords.

The internet spider also obtains mark-up language documents according to the search results as specified by the SERPs (402A). Both the search results and the actual mark-up language documents are stored in a storage cache (404); the search engine results are then stored in a search engine results module (406) within a database (410), which may optionally correspond to the database of analysis subsystem (FIG. 1); while the mark-up language documents are then stored in a webpage storage (208) also within database (410). Webpage storage (208) may also optionally include any type of data fetched with the mark-up language document, including but not limited to HTML, CSS, graphics, video and other content/information.

Figure 5:
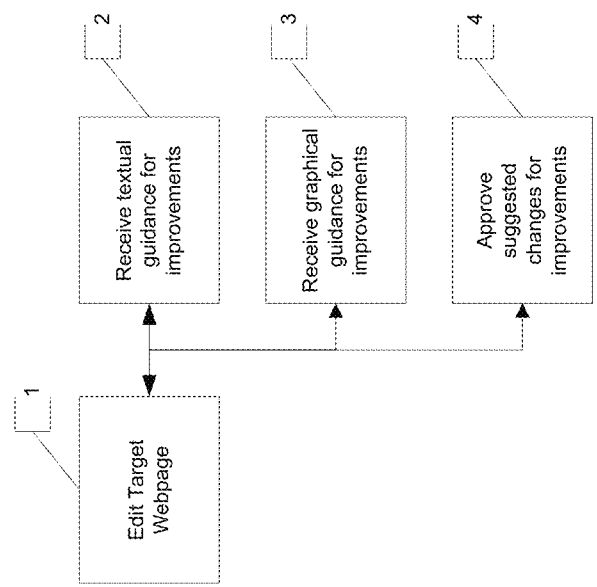
FIG. 5 shows a non-limiting exemplary method for improving a relative rank of a target web page according to at least some embodiments of the present invention.

FIG. 5 shows a non-limiting exemplary method for improving a relative rank of a target web page according to at least some embodiments of the present invention. Again, as previously described, the term "web page" is being used as a non-limiting example of a mark-up language document.

As shown, a target web page is edited, such that at least one change is made (stage 1). Such editing may optionally be performed manually by a user, automatically by an editing software, or a combination thereof. To assist in performing the editing process, preferably textual guidance for improvements is received (stage 2) and/or graphical guidance for improvements (stage 3). More preferably, stages 2 and 3 are performed in a feedback cycle with stage 1 at least once, and most preferably a plurality of times, such that textual and/or graphical guidance from stages 2 and 3 is then input to the editing process of stage 1, for manual and/or automatic performance.

In stage 4, the suggested changes to the target web page are approved to improve the relative ranking of the target web page. Such approval may optionally be performed for each cycle of stages 1-3 or may optionally be performed once after all cycle or cycles of stages 1-3 have been performed.

Figure 6:
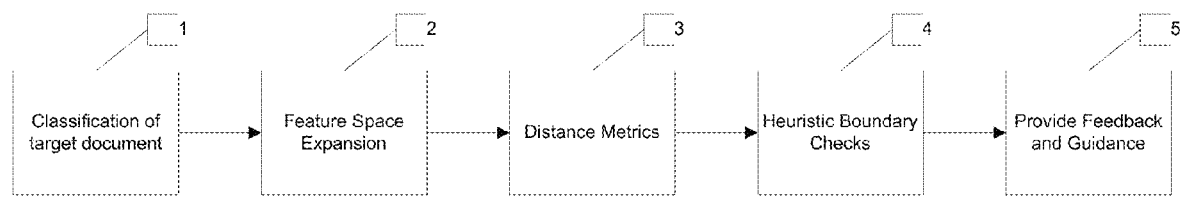
FIG. 6 shows an exemplary, illustrative method for overall analysis of the target mark-up language document according to some non-limiting embodiments of the present invention.

FIG. 6 shows an exemplary, illustrative method for overall analysis of the target mark-up language document according to some non-limiting embodiments of the present invention. As shown, the method starts with classification of the target mark-up language document with regard to the previously described reduced feature space (stage 1). Next the feature space is expanded (stage 2). One or more distance metrics are used to determine the distance or difference between the target document and the received mark-up language document results with regard to their relative ranking (stage 3). One or more heuristic boundary checks are then performed in stage 4, to correct or adjust any of the previously described analyses of the documents performed according to the feature space. Feedback and guidance for altering the target document in order to improve its relative ranking is then provided (stage 5).

Figure 7:
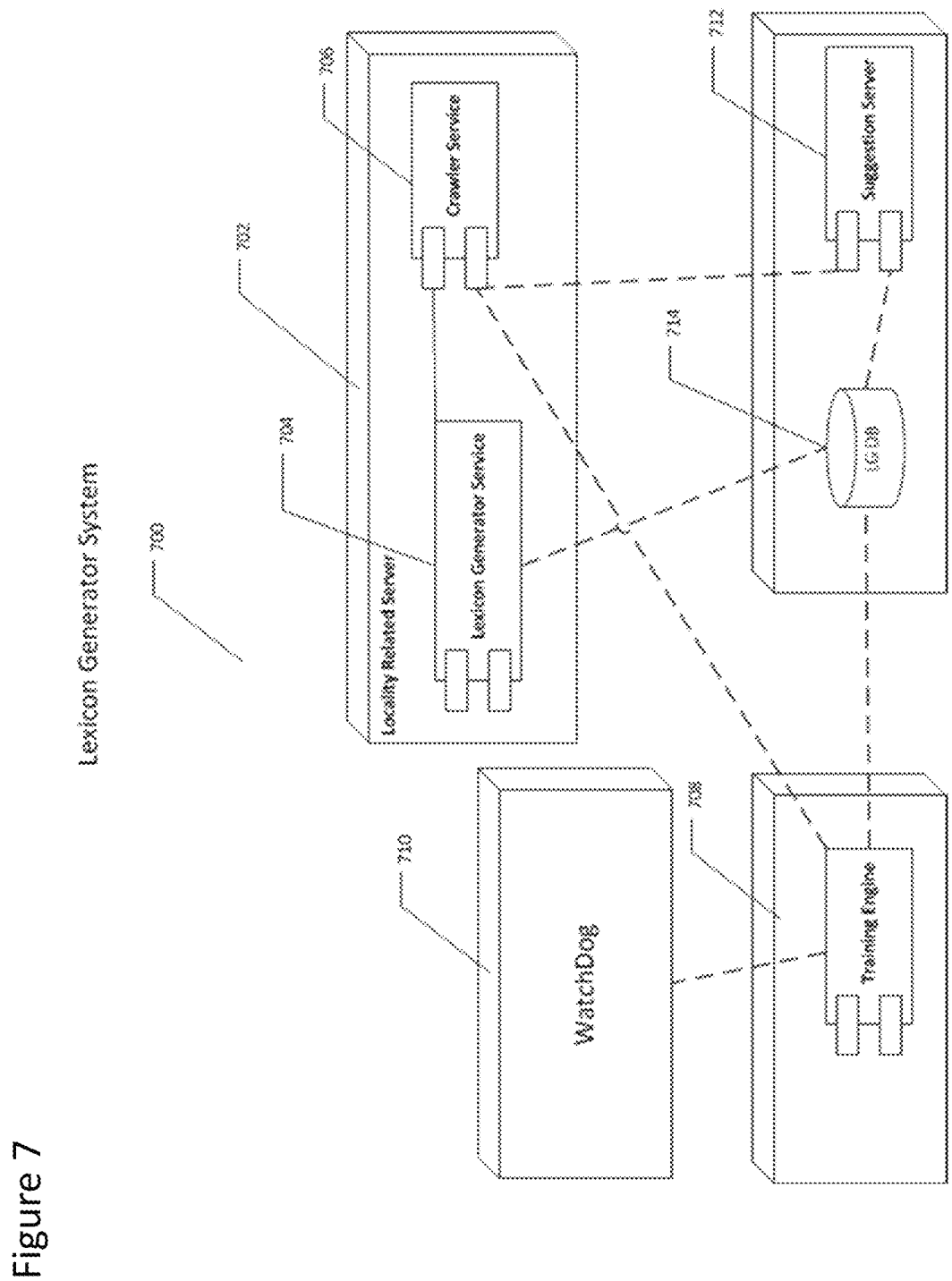
FIG. 7 relates to a lexicon generator system according to at least some embodiments of the present invention.

FIG. 7 relates to a lexicon generator system according to at least some embodiments of the present invention. As shown, a lexicon generator system 700 features a locality related server 702, which is specific for a particular locality, of which only one is shown for the purpose of illustration only and without intending to be limiting in any way. By "locality" it is not necessarily meant a physical location but rather a language based location, which would typically incorporate language and cultural factors (the latter would typically be language based, for example relating to slang or language constructs based upon cultural expressions). For example, English is spoken in both London and New York City, yet London-based English would have a separate locality server 702 than New York City-based English. Furthermore, as described in greater detail below, a user physically based in London might still prefer or need to use the New York City-based English locality server 702.

Locality related server 702 preferably features a lexicon generator service 704 and a crawler service 706. Lexicon generator service 704 provides a lexicon for the specific locality, which as described above is a combination of language and cultural factors. Lexicon generator service 704 preferably constructs the lexicon. For the purpose of discussion only and without any intention of being limiting, it is assumed that lexicon generator service 704 generates the lexicon at least partially based upon search engine ranking results. By "topic modeling" it is meant any type of statistically based analysis of language related to a particular subject area or topic. The subject area may optionally be defined narrowly or broadly, but to the extent that the subject area or topic is defined more specifically, it is expected that the resultant model would capture more features of the language and/or capture them more precisely.

Without wishing to be limited in any way, optionally lexicon generator service 704 generates the lexicon by first obtaining a word count of each word in a collection of related documents; in this non-limiting example, the search engine ranking results serve to determine the extent to which the documents are related (and also which documents are related), such that the training process is supervised training. Optionally and preferably, every word appearing at least once in any document has a database entry and the number of times the word appears is also recorded.

Once the collection of words has been established, preferably any stop words are eliminated. Stop words are those words appearing frequently in all documents, regardless of topic ("and", "the", "a", "an", "is", and so forth). The determination of which words are "stop words" is typically language dependent; for example, the stop words may optionally be taken from a list of known stop words in a particular language. Alternatively or additionally, a list of stop words may optionally be determined from the collection of documents itself, for example by determining which words appear with a statistical frequency that is greater than a threshold. Optionally phrases comprising such stop words ("for sale") are not eliminated if the phrase itself is determined to be important.

After stop words are removed, the most frequently appearing terms for this specific topic, preferably which do not appear frequently for other topics, form the lexicon for the topic. For example, optionally a scoring system may be used to determine which words appear in the lexicon, and optionally and preferably also determines the ordering of the words in the lexicon.

Such a scoring system may optionally comprise determining the number of documents in which the lexicon term appears for the topic under consideration ("NumDocs") and multiplying by the average number of occurrences of this term per document (again, within the context of this topic; "AvgOccur"). However, such a simple calculation could enable a frequently occurring (but otherwise irrelevant) word to be selected. To help prevent such an artifact, preferably the highest ranking document in which the term occurs is determined (HighRank) and the score is adjusted accordingly: Score=(NumDocs*AvgOcur)/HighRank.

The division by the HighRank ensures that the rank or relevancy of the document is also considered, thereby preventing a non-relevant word that appears more frequently in low ranking documents from being selected.

Lexicon generator service 704 preferably receives web pages and also search engine ranking results from crawler service 706 in order to analyze the search engine results as described above. Crawler service 706 optionally operates similarly to data collector 110, in that crawler service 706 at least requests and receives search engine ranking results; crawler service 706 may also optionally retrieve one or more mark-up language documents according to the search engine ranking results.

Lexicon generator service 704 then generates the lexicon according to these search engine results and also according to a topic model generated by a training engine 708. Training engine 708 optionally and preferably models a topic or subject area based upon an analysis of the language used, particularly with regard to the words selected, word frequency and also optionally with regard to word constructs (for example, having a plurality of words featured in the same sentence, same paragraph etc). Other types of language may also optionally be performed as previously described. The language analysis also preferably relates to the effect of such language on search engine ranking results as previously described. Training engine 708 may therefore optionally have a crawler service (not shown) or alternatively may optionally use crawler service 706.

Once the lexicon has been generated by lexicon generator service 704, a suggestion server 712 uses the lexicon to provide one or more language adjustment suggestions to a document as previously described, for example through a client (not shown). The lexicon may optionally be saved locally at a lexicon database 714; alternatively, suggestion server 712 may communicate with lexicon generator service 704 for each suggestion. Suggestion server 712 optionally and preferably communicates with lexicon generator service 704 to determine the efficacy of suggestions provided, such that lexicon generator service 704 optionally determines the actual search engine ranking of a mark-up language document that has been adjusted according to one or more suggestions from suggestion server 712. Training engine 708 preferably operates at least once to provide the topic model for lexicon generator service 704, but may also optionally be invoked again, one or more times, to adjust the topic model, by a watchdog 710 according to at least some embodiments of the present invention. Watchdog 710 preferably samples at least a portion of search engine results, such that for example, such an adjustment may be invoked according to a comparison of the actual and predicted search engine rankings; if the predicted rankings are too distant from the actual rankings, then watchdog 710 may optionally activate training engine 708. The actual and predicted search engine rankings are optionally compared by watchdog 710. If the predicted values are too far off from some specified tolerance, then the topic model is preferably reviewed and if necessary adjusted, more preferably through invoking the training engine 708 as noted previously.

By "distant" it is meant that the numerical difference between the predicted and actual search engine rankings is greater than a threshold level.

Once watchdog 710 has activated training engine 708, the above process for generating the topic model is preferably repeated, after which lexicon generator service 704 receives the new model and generates a new lexicon based upon this model.

Figure 8:
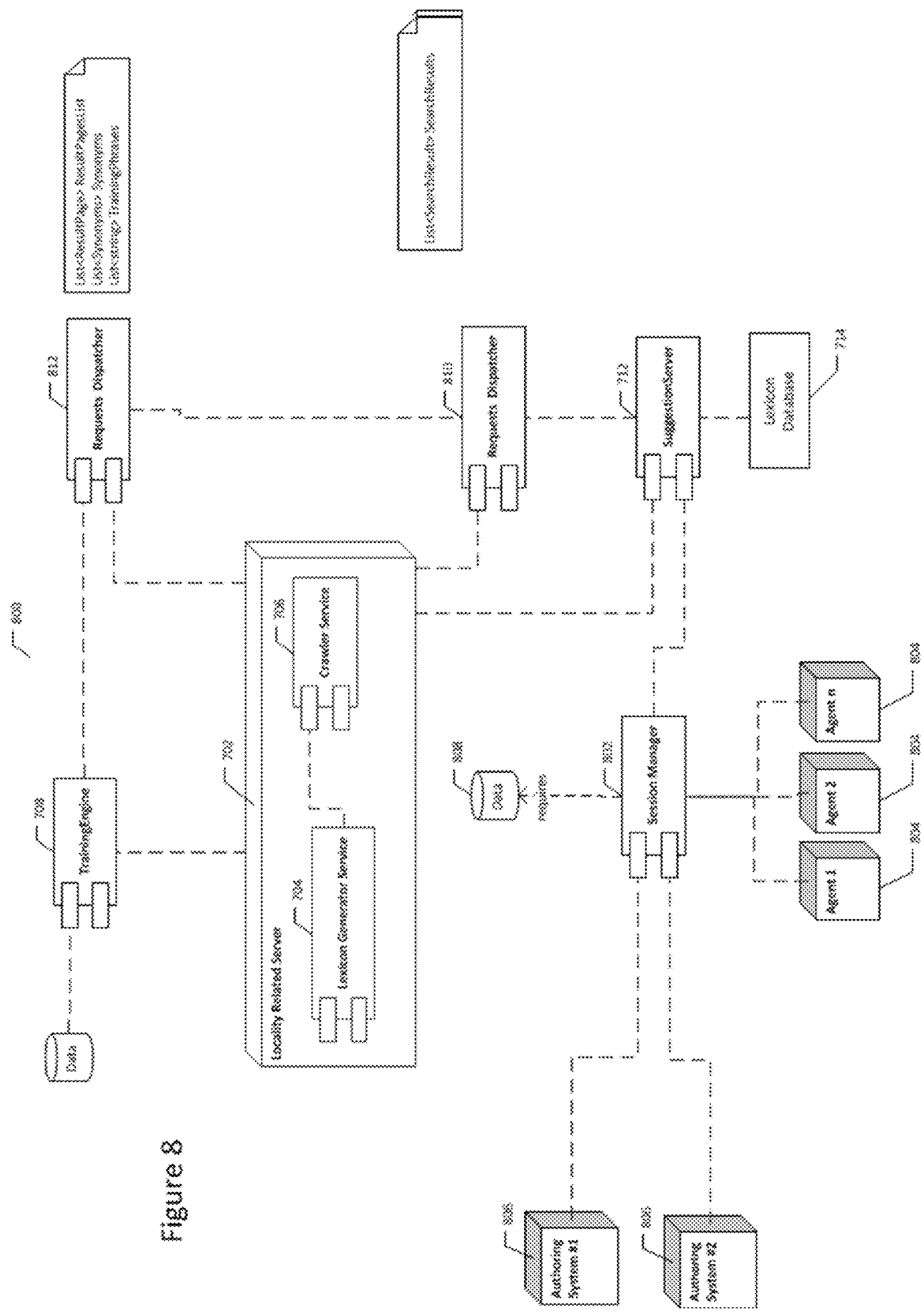
FIG. 8 relates to a system for providing content adjustment suggestions.

As shown with regard to a system 800 of FIG. 8, suggestion server 712 preferably makes suggestions for changing one or more words of a document according to the generated lexicon through a session manager 802. Session manager 802 in turn is in communication with one or more document generation and/or editing software, directly or indirectly. Session manager 802 preferably provides suggestions to such software and also receives feedback in terms of the changes made to suggestion server 712. Data may optionally be buffered through a database 808.

As non-limiting examples, two types of such software are shown: an agent 804 (of which three are shown for the purpose of illustration and without any intention of being limiting) and an authoring system 806 (of which two are shown for the purpose of illustration and without any intention of being limiting). Agent 804 optionally operates with any type of document generation and/or editing software as an "add on" to such software as previously described. Session manager 802 may also optionally communicate directly with authoring system 806, such that the suggestions are provided through authoring system 806 in an integrated manner that is optionally and preferably transparent to the end user.

If a keyword is not known to suggestion server 712, then optionally a request is sent from suggestion server 712 to a request dispatcher 810. Request dispatcher 810 then preferably communicates with locality related server 702 to analyze the unknown keyword. If the keyword is not part of the lexicon generated by lexicon generator 704, then optionally and preferably crawler 706 is invoked to determine a ranking based upon this keyword, after which search engine rankings and optionally any synonyms are to suggestion server 712. Optionally another request dispatcher 812 handles requests made by training engine 708 as previously described.

Figure 9:
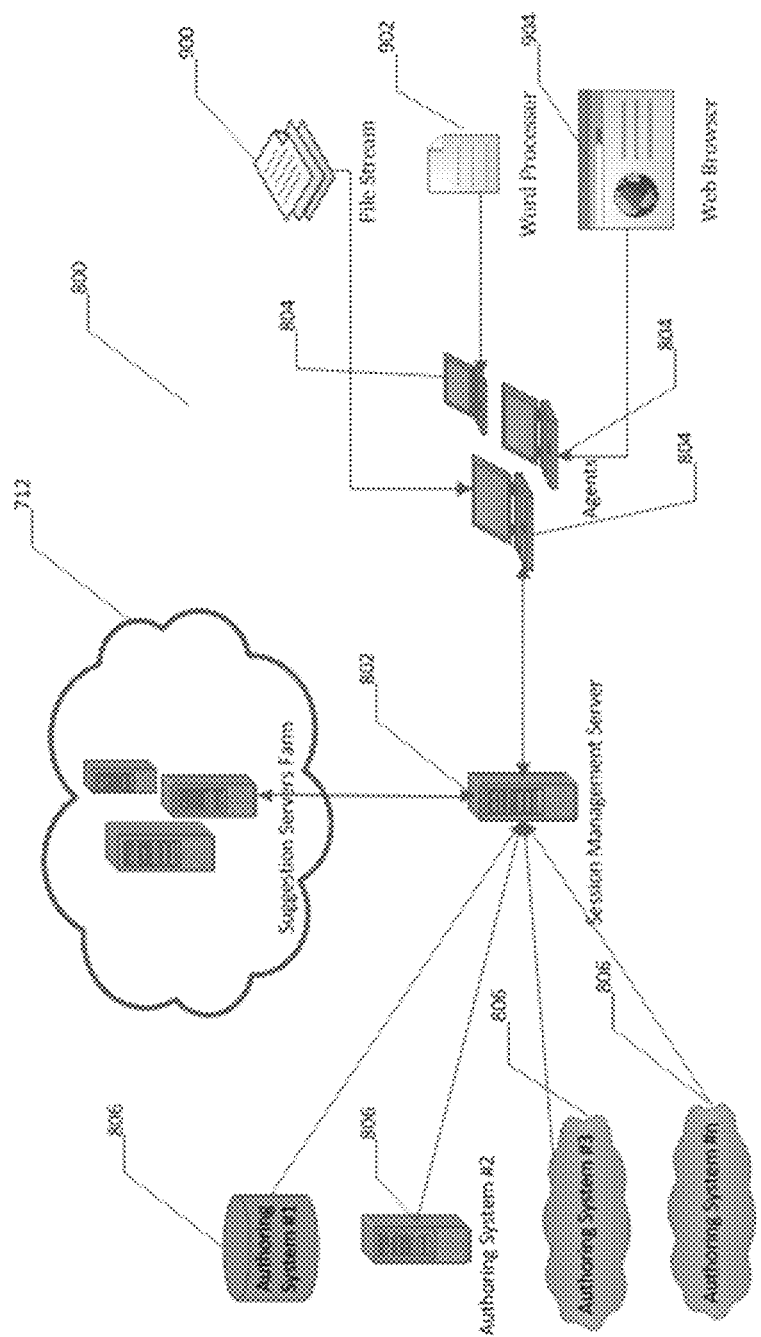
FIG. 9 relates to the operation of suggestion server in more details.

FIG. 9 shows interactions of suggestion server 712 with other components of system 800 in more detail (only a portion of system 800 is shown for clarity). Suggestion server 712 may optionally be implemented as a server farm as shown. Suggestion server 712 preferably communicates with authoring systems 806 and agents 804 through session management server 802 as shown and as previously described. Agents 804 are shown as being in communication with a file stream 900, a word processor software 902 and a web browser 904. File stream 900 is optionally any communications channel. Agents 804 may optionally be present on a user computer operating each of the above types of software (not shown) or alternatively may be present at a remote location and may interact with each software remotely.

Figure 10:
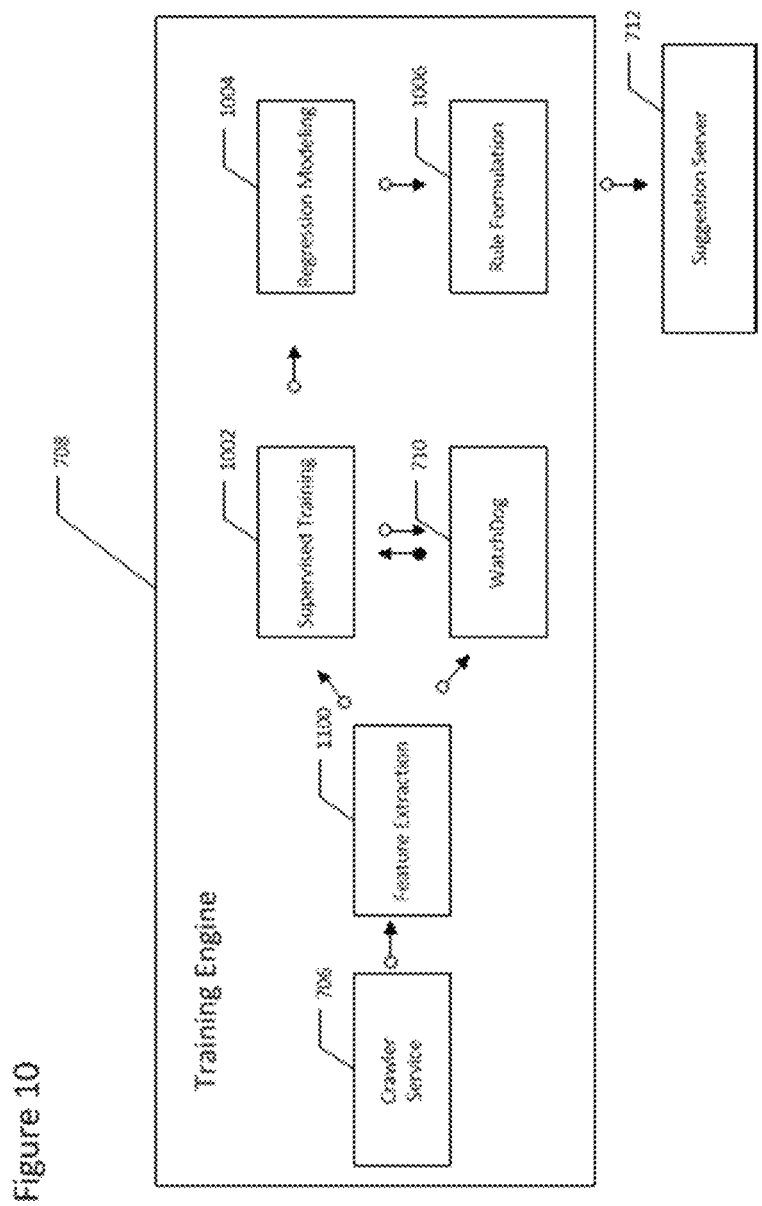
FIG. 10 relates to an exemplary, illustrative embodiment of the training engine.

FIG. 10 shows an exemplary non-limiting illustrative embodiment of training agent 708 in more detail, as a schematic functionally based process diagram. As shown training engine 708 features a crawler service 706 (as previously described, training engine 708 may optionally communicate with the crawler service of the locality related server (not shown)) which returns results of search engine rankings of mark-up language documents. These results are preferably provided to a feature extraction module 1100, which optionally extracts one or more features of the results as described in greater detail with regard to FIG. 2. These features are then preferably provided to a supervised training module 1002, which may optionally be implemented as described with regard to FIG. 2 for example. Supervised training module 1002 communicates with a regression modeling module 1004 for analyzing language through statistical regression analysis. The results are provided to a rule formulation module 1006, which generates a set of rules for the lexicon. This set of rules may then optionally be provided to suggestion server 712 or alternatively may be the basis for providing suggestions to suggestion server 712.

Also as shown, training engine 708 optionally features watchdog 710, which may also be implemented separately (not shown). Watchdog 710 preferably also receives the features from feature extraction module 1100 and compares them to predicted ranking results; as previously described, if too great a distance is found between the predicted and actual ranking results, watchdog 710 preferably activates supervised training module 1002 in order to generate a new or adjusted set of rules by rule formulation module 1006.

Figure 11:
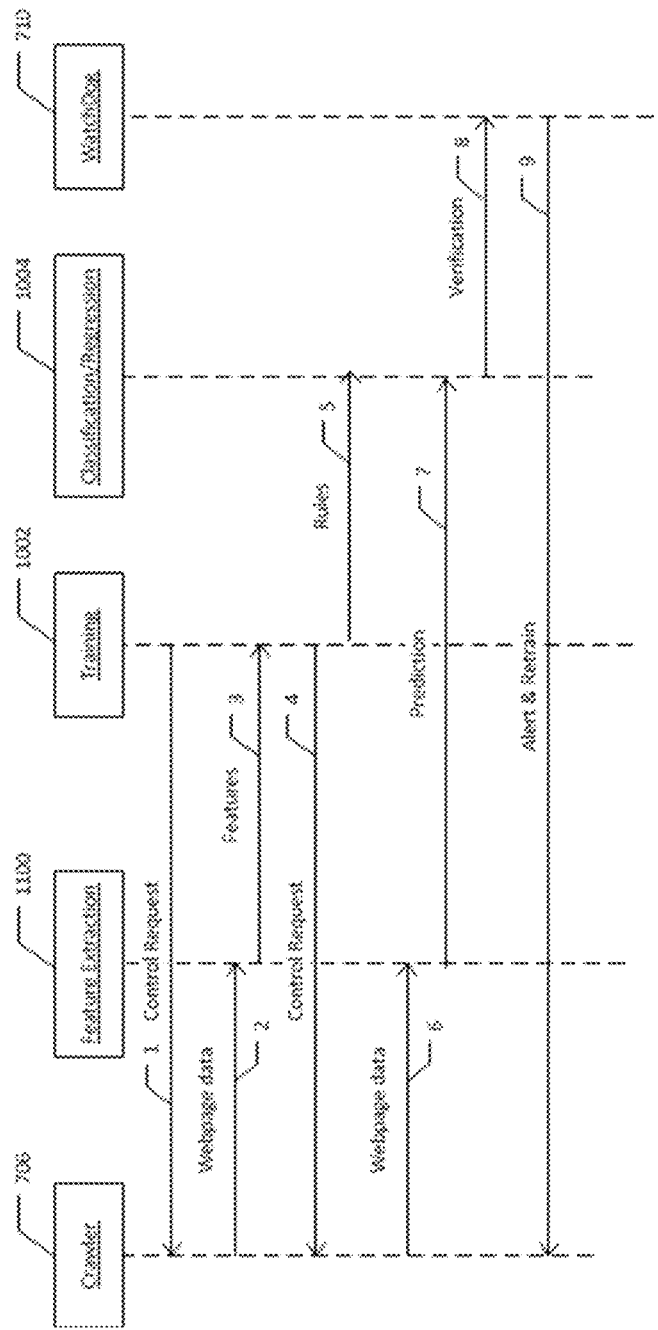
FIG. 11 shows a flow diagram for an exemplary, illustrative process for operation of the training engine according to at least some embodiments of the present invention.

FIG. 11 shows a flow diagram for an exemplary, illustrative process for operation of the training engine according to at least some embodiments of the present invention. As shown, the process is performed with previously described modules and also with a feature extraction module 1100. Feature extraction module 1100 may optionally be implemented as for the feature extraction module of FIG. 2 and preferably operates to extract one or more features of importance for search engine ranking as previously described.

The process optionally and preferably starts with crawler service 706 being activated by a control request from supervised training module 1002 (arrow 1). Crawler service 706 may optionally be directly invoked by watchdog 710 as shown (arrow 8) or by feature extraction module 1100 (not shown). After being invoked, crawler service 706 provides search results (arrow 2), more preferably in the form of search engine rankings and also mark-up language documents ranked in such rankings, to feature extraction module 1100.

Feature extraction module 1100 analyzes the search results with regard to both the rankings and also the mark-up language documents to extract one or more features, which are then provided to supervised training module 1002 (arrow 3). Training module 1002 may optionally request further and/or repeated feature extraction one or more times (arrow 4).

Once supervised training module 1002 has obtained sufficient features, supervised training module 1002 then analyzes these features in order to determine which ones are important; the relative importance and also optionally a reduced feature space (preferably only including features that are deemed to have at least a threshold level of importance as previously described) are provided to regression module 1004 as a set of rules (arrow 5). Optionally, in order to determine whether the rules accurately predict search engine ranking behavior, crawler service 706 provides additional search results to feature extraction module 1100 (arrow 6), whether automatically or through a control request (not shown). Feature extraction module 1100 then extracts one or more features and compares actual to expected results. This information is then provided to regression module 1004 (arrow 7).

Based upon this information, regression module 1004 selects and/or determines one or more rules, for example for constructing the lexicon as previously described.

Optionally at least once (and preferably repeatedly), verification of these rules is performed by watchdog 710 in response to information provided by regression module 1004 (arrow 8).

Watchdog 710 may optionally invoke crawler service 710 again to restart the process as previously described (arrow 9).

Figure 12C:
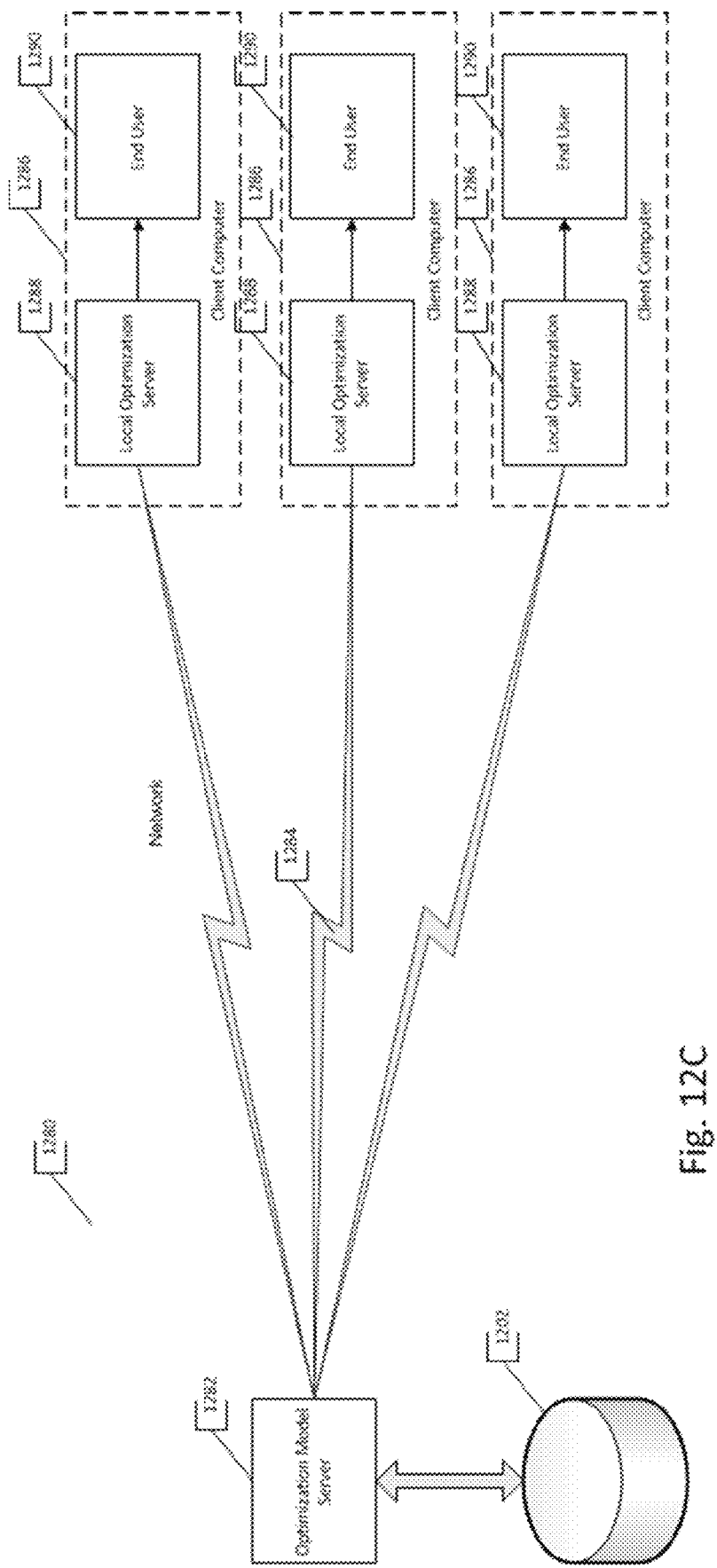
FIG. 12C relates to a SAAS (software as service) model for local processing.

FIG. 12 shows three exemplary, illustrative systems for delivery of optimization guidance and feedback according to at least some embodiments of the present invention: FIG. 12A relates to a distributed SAAS (software as service) model for an enterprise; FIG. 12B relates to a distributed SAAS (software as service) model for individual users; and FIG. 12C relates to a SAAS (software as service) model for local processing.

As shown in FIG. 12A, a system 1200 features a database 1202 and an optimization model server 1204. Optimization model server 1204 performs all or part of the processing needed for the previously described methods of optimization feedback and guidance for a target mark-up language document. Optimization model server 1204 communicates with a local optimization server 1210 through a computer network 1206, such as the Internet for example. Local optimization server 1210 may optionally perform part or all of the necessary processing for the previously described methods of optimization feedback and guidance for a target mark-up language document, alone or in conjunction with optimization model server 1204. Local optimization server 1210 may optionally be located within an enterprise 1208 as shown, which contains a plurality computers 1212, directed by end users 1214, which may optionally receive services regarding the previously described methods of optimization feedback and guidance for a target mark-up language document through SAAS.

FIG. 12B shows a system 1250 in which an optimization server 1252 communicates directly with a plurality of end user computers 1256 through a computer network 1254, which may optionally be the Internet for example, to provide the previously described methods of optimization feedback and guidance for a target mark-up language document through SAAS. End user computers 1256 are operated by end users 1258 as shown.

FIG. 12C shows a system 1280 in which an optimization model server 1282 communicates with a plurality of local optimization servers 1288 through a computer network 1284 which may optionally be the Internet for example. Local optimization servers 1288 operate in conjunction with a plurality of client computers 1286 operated by a plurality of end users 1290, to provide the previously described methods of optimization feedback and guidance for a target mark-up language document as distributed SAAS.

FIGS. 13-16 show exemplary, illustrative, non-limiting screenshots with regard to the user GUI (graphical user interface) for interacting with the previously described system, for example and without limitation through the application layer as described with regard to FIG. 1.

Figure 13:
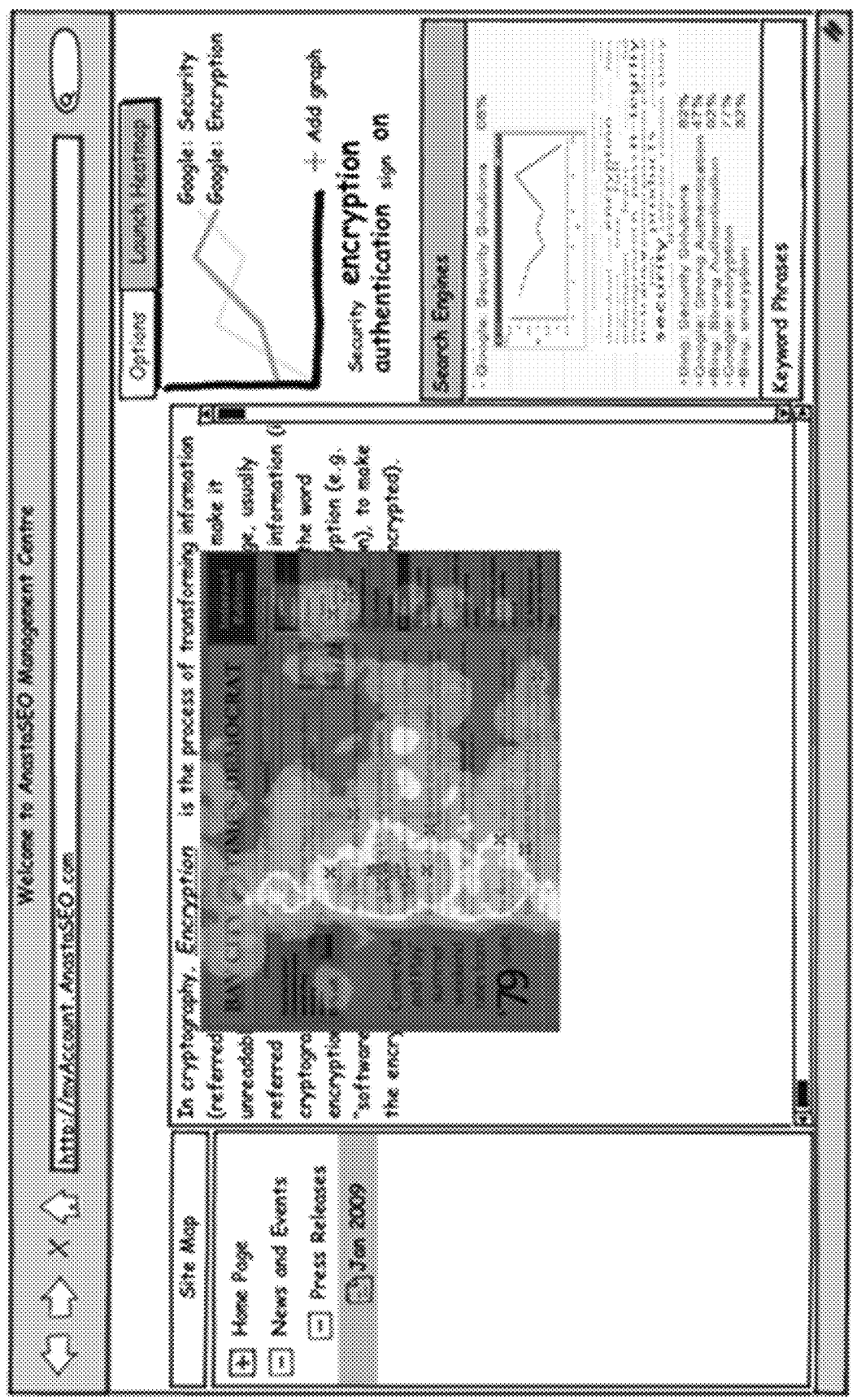
FIGS. 13-16 show exemplary, illustrative, non-limiting screenshots with regard to the user GUI (graphical user interface) for interacting with the previously described system, for example and without limitation through the application layer as described with regard to FIG. 1.
Figure 14:
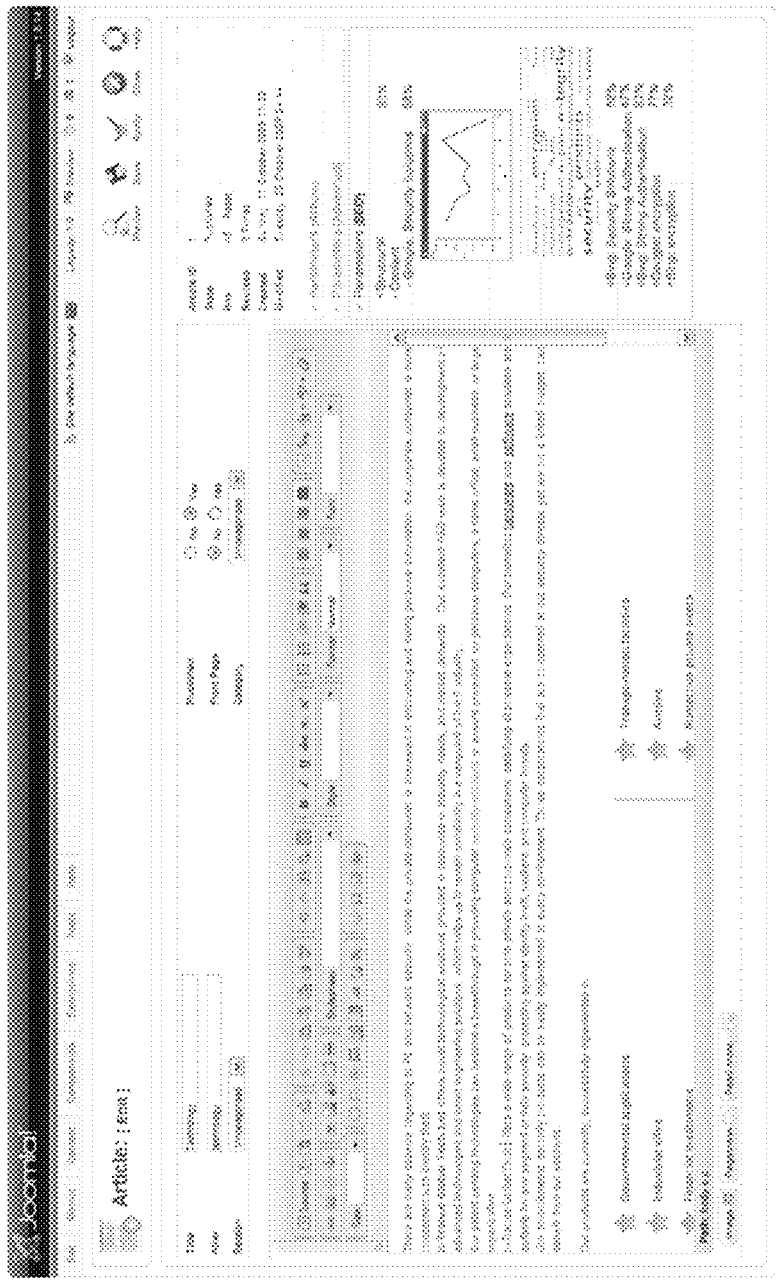
Figure 15:
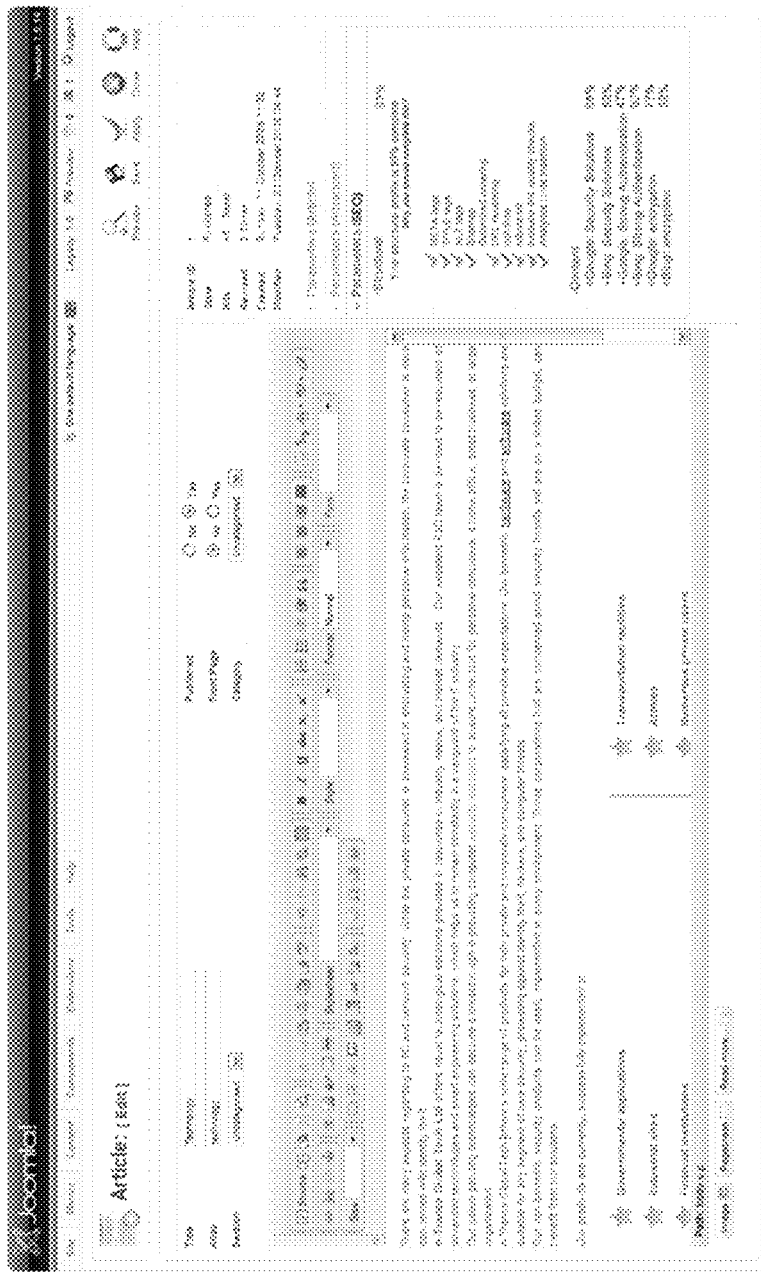
Figure 16:
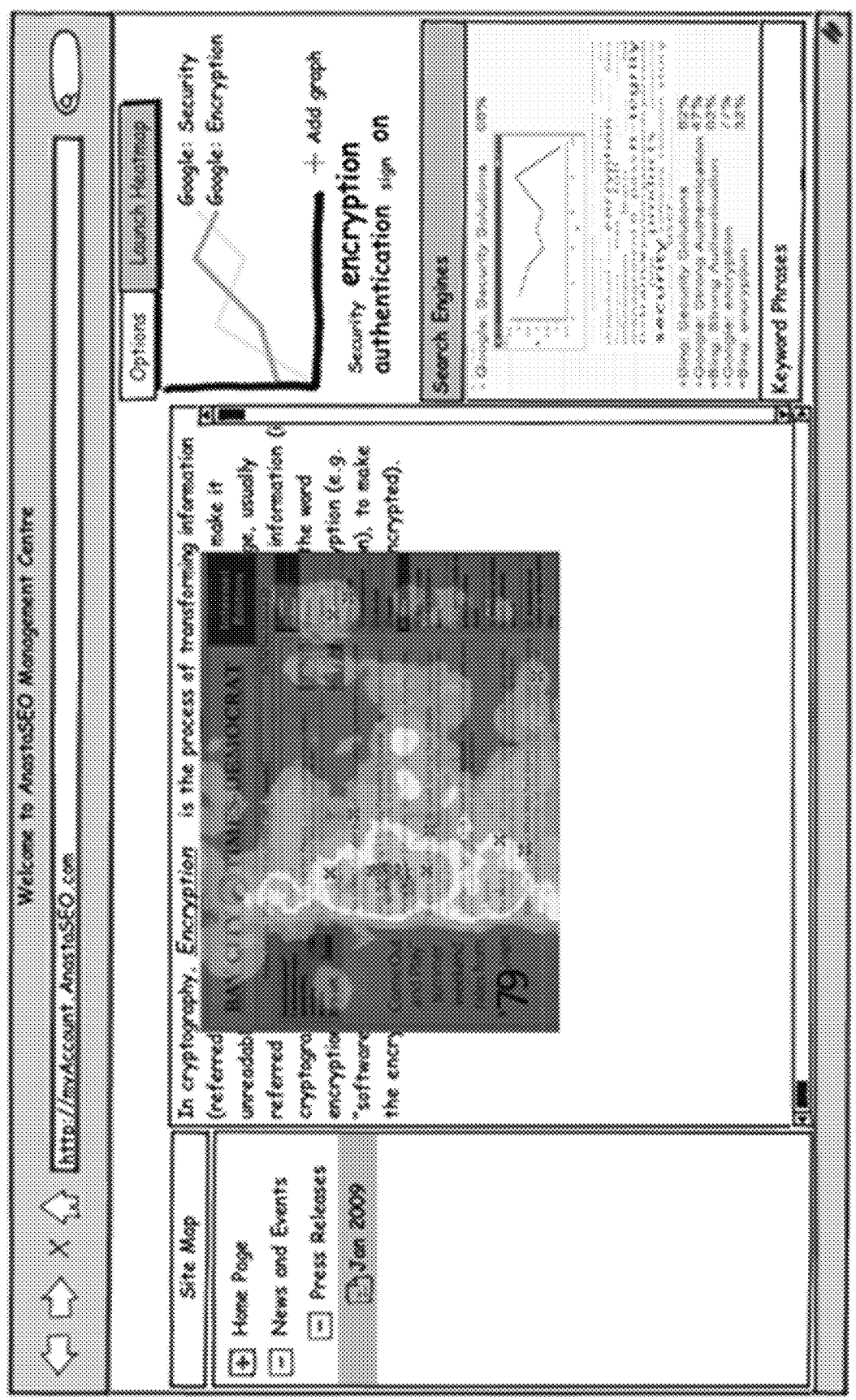

FIG. 13 shows a screenshot with a suggestion for changing one or more of words of the text, font style and so forth in order to increase the rank of a target web page. FIG. 14 shows an exemplary web page being edited, with a graphically illustrated "real time" graph of the effects of one or more changes to the web page on the relative rank. FIG. 15 shows other feature for analysis of an edited web page. FIG. 16 shows a "heat map" of the important parts of a web page, which may optionally change as one or more changes are made to the web page.

APPENDIX A

List of features from Markup Language Document Analysis

The following is a non-exhaustive list of features used in the analysis.

Keyword Specific Features:
1. Keyword Use Anywhere in the Title Tag
2. Keyword Use as the First Word(s) of the Title Tag
3. Keyword Use in the Root Domain Name (e.g. keyword.com)
4. Keyword Use Anywhere in the H1 Headline Tag
5. Keyword Use in Internal Link Anchor Text on the Page
6. Keyword Use in External Link Anchor Text on the Page
7. Keyword Use as the First Word(s) in the H1 Tag
8. Keyword Use in the First 50-100 Words in HTML on the Page
9. Keyword Use in the Subdomain Name (e.g. keyword.seomoz.org)
10. Keyword Use in the Page Name URL (e.g. seomoz.org/folder/keyword.html)
11. Keyword Use in the Page Folder URL (e.g. seomoz.org/keyword/page.html)
12. Keyword Use in other Headline Tags (<h2>-<h6>)
13. Keyword Use in Image Alt Text
14. Keyword Use/Number of Repetitions in the HTML Text on the Page
15. Keyword Use in Image Names Included on the Page (e.g. keyword.jpg)
16. Keyword Use in <b> or <strong> Tags
17. Keyword Density Formula (# of Keyword Uses÷Total # of Terms on the Page)
18. Keyword Use in List Items <li> on the Page
19. Keyword Use in the Page's Query Parameters (e.g. seomoz.org/page.html?keyword)
20. Keyword Use in <i> or <em> Tags
21. Keyword Use in the Meta Description Tag
22. Keyword Use in the Page's File Extension (e.g. seomoz.org/page.keyword)
23. Keyword Use in Comment Tags in the HTML
24. Keyword Use in the Meta Keywords Tag Non-Keyword Specific Features:
1. Existence of Substantive, Unique Content on the Page
2. Recency (freshness) of Page Creation
3. Use of Links on the Page that Point to Other URLs on this Domain
4. Historical Content Changes (how often the page content has been updated)
5. Use of External-Pointing Links on the Page
6. Query Parameters in the URL vs. Static URL Format
7. Ratio of Code to Text in HTML
8. Existence of a Meta Description Tag
9. HTML Validation to W3C Standards
10. Use of Flash Elements (or other plug-in content)
11. Use of Advertising on the Page
12. Use of Google AdSense (specifically) on the Page Page-Specific Link Popularity Ranking Factors:
1. Keyword-Focused Anchor Text from External Links
2. External Link Popularity (quantity/quality of external links)
3. Diversity of Link Sources (links from many unique root domains)
4. Page-Specific TrustRank (whether the individual page has earned links from trusted sources)
5. Iterative Algorithm-Based, Global Link Popularity (PageRank)
6. Topic-Specificity/Focus of External Link Sources (whether external links to this page come from topically relevant pages/sites)
7. Keyword-Focused Anchor Text from Internal Links
8. Location in Information Architecture of the Site (where the page sits in relation to the site's structural hierarchy)
9. Internal Link Popularity (counting only links from other pages on the root domain)
10. Quantity & Quality of Nofollowed Links to the Page
11. Percent of Followed vs. Nofollowed Links that Point to the Page Site-Wide Link-Based Ranking Factors:
1. Trustworthiness of the Domain Based on Link Distance from Trusted Domains (e.g. TrustRank, Domain mozTrust, etc.)
2. Global Link Popularity of the Domain Based on an Iterative Link Algorithm (e.g. PageRank on the domain graph, Domain mozRank, etc.)
3. Link Diversity of the Domain (based on number/variety of unique root domains linking to pages on this domain)
4. Links from Hubs/Authorities in a Given Topic-Specific Neighborhood (as per the "Hilltop" algorithm)
5. Temporal Growth/Shrinkage of Links to the Domain (the quantity/quality of links earned over time and the temporal distribution)
6. Links from Domains with Restricted Access TLD Extensions (e.g. .edu, .gov, .mil, .ac.uk, etc.)
7. Percent of Followed vs. Nofollowed Links that Point to the Domain Site-Wide (non-link based) Ranking Factors:
1. Site Architecture of the Domain (whether intelligent, useful hierarchies are employed)
2. Use of External Links to Reputable, Trustworthy Sites/Pages
3. Length of Domain Registration
4. Domain Registration History (how long it's been registered to the same party, number of times renewed, etc.)
5. Server/Hosting Uptime 6. Hosting Information (what other domains are hosted on the server/c-block of IP addresses)
7. Domain Registration Ownership Change (whether the domain has changed hands according to registration records)
8. Inclusion of Feeds from the Domain in Google News
9. Use of XML Sitemap(s)
10. Domain Ownership (who registered the domain and their history)
11. Domain Registration with Google Local
12. Domain "Mentions" (text citations of the domain name/address even in the absence of direct links)
13. Inclusion of Feeds from the Domain in Google Blog Search
14. Citations/References of the Domain in the Yahoo! Directory (beyond the value of the link alone)
15. Citations/References of the Domain in DMOZ.org (beyond the value of the link alone)
16. Citations/References of the Domain in Wikipedia (beyond the value of the link alone)
17. Use of Feeds on the Domain
18. Citations/References of the Domain in the Librarian's Internet Index—Lii.org (beyond the value of the link alone)
19. Domain Registration with Google Webmaster Tools
20. Activation of Google's "Enhanced Image Search" (aka image labeler)
21. Use of Security Certificate on the Domain (for HTTPS transactions)
22. Validity of Mailing Address/Phone Numbers/Records from Domain Registration
23. Citations/References of the Domain in Google Knol Articles (beyond the value of the link alone)
24. Use of a Google Search Appliance on the Domain
25. Use of Google AdSense on the Domain
26. Use of Google AdWords for Ads Pointing to the Domain
27. Alexa Rank of the Domain (independent of actual traffic)
28. Compete.com Rank of the Domain (independent of actual traffic)
29. Use of Google's Hosted Web Apps (not App Engine) on the Domain Social Media/Social Graph Based Ranking Factors
1. Delicious Data About the Domain or Page
2. StumbleUpon Data About the Domain or Page
3. Twitter Data About the Domain or Page
4. LinkedIn Data About the Domain or Page
5. Facebook Data About the Domain or Page
6. MySpace Data About the Domain or Page Usage Data Ranking Factors
1. Historical Click-Through Rate from Search Results to the Exact Page/URL
2. Historical Click-Through Rate from Search Results to Pages on this Domain
3. Search Queries for the Domain Name or Associated Brand
4. Use of Query Refinement Post-Click on a Search Result
5. Average "Time on Page" Duration
6. Data from Google's SearchWiki Voting, Ratings, Comments
7. References/Links to the Domain in Gmail Emails Negative Ranking Factors
1. Cloaking with Malicious/Manipulative Intent
2. Link Acquisition from Known Link Brokers/Sellers
3. Links from the Page to Web Spam Sites/Pages
4. Cloaking by User Agent
5. Frequent Server Downtime & Site Inaccessibility
6. Hiding Text with same/similar colored text/background
7. Links from the Domain to Web Spam Sites/Pages
8. Excessive Repetition of the Same Anchor Text in a High Percentage/Quantity of External Links to the Site/Page
9. Cloaking by IP Address
10. Hiding Text with CSS by Offsetting the Pixel display outside the visible page area
11. Excessive Number of Dynamic Parameters in the URL
12. Excessive Links from Sites Hosted on the Same IP Address C-Block
13. Link Acquisition from Manipulative Bait-and-Switch Campaigns (301'ing microsites, etc.)
14. Keyword Stuffing in the On-Page Text
15. Hiding Text with CSS display:none; Styling
16. Keyword Stuffing in the <title> Tag
17. Keyword Stuffing in the URL
18. Link Acquisition from Manipulative Widget/Badge Campaigns
19. Cloaking by JavaScript/Rich Media Support Detection
20. Cloaking by Cookie Detection
21. Link Acquisition from Low Quality Paid Directories
22. Excessive Links from Sites Owned by the Same Registrant
23. Links to the Page from Web Spam Sites/Pages
24. Links to the Domain from Web Spam Sites/Pages
25. Link Acquisition from Manipulative Viral Campaigns
26. Cloaking with Positive User Experience Intent
27. Over-Optimization of Internal Link Anchor Text
28. Use of "Poison" Keywords in Anchor Text of External Links (e.g. student credit cards, buy viagra, porn terms, etc.)
29. Link Acquisition from Buying Old Domains & Redirecting
30. Excessively Long URL
31. Use of Keyword-Rich Anchor Text Internal Links in Footers
32. Keyword Stuffing in the Meta Description Tag
33. Link Acquisition from Buying Old Domains and Adding Links
34. Overuse of Nofollow on Internal Links for "PageRank Sculpting"
35. Forum Link Building (Signatures, Link Drops, etc.)
36. Excessively Long Title Tag
37. Keyword Stuffing in the Meta Keywords Tag Factors Negatively Affecting the Value of an External Link
1. Domain Banned from Google's Index for Web Spam
2. Domain's Rankings Penalized in Google for Web Spam
3. Link is Determined to be "Paid" Rather than Editorially Given
4. Domain Contains Links to a Significant Amount of Web Spam
5. Domain Has Not Earned Trusted Links Geo-Targeting Factors:
1. Country Code TLD of the Root Domain (e.g. .co.uk, .de, .fr, .com.au, etc.)
2. Language of the Content Used on the Site
3. Links from Other Domains Targeted to the Country/Region
4. Geographic Location of the Host IP Address of the Domain
5. Manual Review/Targeting by Google Engineers and/or Quality Raters
6. Geo-Targeting Preference Set Inside Google Webmaster Tools
7. Registration of the Site with Google Local in the Country/Region 8. Address in On-Page Text Content
9. Address Associated with the Registration of the Domain
10. Geographic Location of Visitors to the Site (the country/region from which many/most visitors arrive)
11. Geo-Tagging of Pages via Meta Data (e.g. Dublin Core Meta Data Initiative)

APPENDIX B

Methods of Training and Classification Include are not Limited to

1. Decision Trees
2. TreeBoost—Boosted Decision Trees
3. Decision Tree Forests
4. Multilayer Perceptron Neural Networks
5. RBF Neural Networks
6. GMDH Polynomial Neural Networks
7. Cascade Correlation Neural Networks
8. Probabilistic Neural Networks
9. General Regression Neural Networks
10. Support Vector Machine (SVM)
11. Gene Expression Programming—Symbolic Regression
12. K-Means Clustering
13. Linear Discriminant Analysis (LDA)
14. Linear Regression
15. Logistic Regression It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for analyzing an initial mark-up language document that is indexable by an internet based indexing computer program, the method being performed by a computer, the method comprising: inputting at least one search phrase to the internet based indexing computer program through the internet;
receiving a response to said inputting, said response including a list of links of a plurality of returned mark-up language documents, said list of links of said plurality of returned mark-up language documents being ranked by said internet based indexing computer program;
retrieving said plurality of returned mark-up language documents according to said list of links to form retrieved mark-up language documents;
analyzing said plurality of retrieved mark-up language documents and their respective ranks according to a supervised training procedure, wherein said analyzing according to said supervised training procedure comprises:
determining at least one of a plurality of features of the initial mark-up language document and said plurality of returned mark-up language documents; analyzing at least one of said features of the initial mark-up language document in comparison to said plurality of returned mark-up language documents; wherein said plurality of feature is selected from the group consisting of keyword specific features, non-keyword specific page features, page-specific link popularity ranking factors, usage data ranking factors, site-wide link-based ranking factors, content, metadata and structure and wherein said content is selected from the group consisting of javascript, text, images; wherein said analyzing said features further comprises analyzing said features according to a parameter including phrase use anywhere in the title tag, phrase use as the first word or words of the title tag, phrase use in the root domain name in the uniform resource locator, phrase use in the meta description tag, phrase use in the page's file extension, phrase use in comment tags in the web page, phrase use in the meta phrases tag, freshness of page creation, use of links on the page that point to other uniform resource locators on this domain, frequency of updating page content, use of external-pointing links on the page, query parameters in the uniform resource locator versus static uniform resource locator format, ratio of code to text in html, existence of a meta description tag, html validation to World Wide Web Consortium standards, use of flash elements, and use of advertising on the page; and
analyzing the initial mark-up language document according to said at least one search phrase and said analysis of said response according to said supervised training procedure to form an analysis.

2. The method of claim 1, wherein said inputting said at least one search phrase comprises inputting a plurality of search phrases related to a specific subject, and wherein said analyzing said response comprises determining a difference between the different search phrases in said response by the internet based indexing computer program.

3. The method of claim 1, wherein said analyzing said response according to said supervised training procedure comprises receiving a plurality of returned mark-up language documents, including the initial mark-up language document, and a relative rank of each returned mark-up language document; determining a relative rank of the initial mark-up language document with regard to said plurality of returned mark-up language documents; and analyzing at least one feature of the initial mark-up language document in comparison to said plurality of returned mark-up language documents and said relative rank of the initial mark-up language document.

4. The method of claim 3, wherein said feature is selected from the group consisting of content, metadata and structure.

5. The method of claim 4, wherein said content is selected from the group consisting of javascript, text, images, any type of media including multimedia, and any other suitable type of content.

6. The method of claim 5, wherein said analyzing said content of the initial mark-up language document comprising analyzing said returned mark-up language documents to determine a placement of said search phrase therein.

7. The method of claim 6, wherein said analyzing said content further comprises comparing a phrase density of said search phrase in said returned mark-up language documents to a phrase density in the initial mark-up language document with regard to said relative rank.

8. The method of claim 6, wherein said analyzing said content further comprises comparing a phrase location of said search phrase in said returned mark-up language documents to a phrase location in the initial mark-up language document with regard to said relative rank.

9. The method of claim 4, wherein said structure is selected from the group consisting of location of a plurality of components, use of containers, rules of dynamic web pages, uniform resource locator.

10. The method of claim 3 wherein said metadata is selected from the group consisting of a mark-up tag and a description of a mark-up tag.

11. The method of claim 10, wherein said mark-up tag is selected from the group consisting of a metatag, a page title and a section title.

12. The method of claim 11, wherein said analyzing said feature comprises analyzing said metadata of said returned mark-up language documents in comparison to the initial mark-up language document with regard to said relative rank.

13. The method of claim 12, wherein said analyzing said mark-up language tag or description of said tag further comprises providing a plurality of mark-up language tag phrases; searching said mark-up language tag or description of said tag in said returned mark-up language documents for said plurality of mark-up language tag phrases; searching the initial mark-up language document for said plurality of mark-up language tag phrases; and comparing the initial mark-up language document and said returned mark-up language documents according to said relative rank.

14. The method of claim 11, wherein said metadata comprises a mark-up language tag or description of said tag, and wherein said analyzing said mark-up language tag or description of said tag further comprises comparing said mark-up language tag or description of said tag in said returned mark-up language documents in comparison to the initial mark-up language document with regard to said relative rank.

15. The method of claim 10, wherein said analyzing said returned mark-up language documents further comprises determining a location of each mark-up language tag phrase in said returned mark-up language documents; determining a location of each mark-up language tag phrase in the initial mark-up language document; and comparing said respective locations.

16. The method of claim 3, wherein said analyzing said plurality of returned mark-up language documents further comprises determining at least one difference in metadata phrases between a lower ranked returned mark-up language document and a higher ranked returned mark-up language document.

17. The method of claim 16, wherein said analyzing said plurality of returned mark-up language documents further comprises determining at least one difference in structure between a lower ranked returned mark-up language document and a higher ranked returned mark-up language document.

18. The method of claim 16, wherein said analyzing said response according to said supervised training procedure further comprises training said supervised training procedure according to a plurality of returned mark-up language documents and according to a relative rank of said plurality of returned mark-up language documents.

19. The method of claim 16, wherein said supervised training procedure comprises one or more of the following approaches and methods: analytical learning, artificial neural network, Backpropagation, Bayesian analysis, Decision Trees, Case Based Reasoning, Inductive Logic Programming, Gaussian process regression, Kernel estimators, Learning Automata, Minimum message length, Naive bayes classifier, Nearest Neighbor Algorithm, Probably approximately correct learning, Ripple down rules, Symbolic machine learning algorithms, Subsymbolic machine learning algorithms, Support vector machines, Random Forests, Ensembles of Classifiers, Ordinal Classification, Data Pre-processing, Handling imbalanced datasets, Statistical relational learning.

20. The method of claim 3, wherein the internet based indexing program comprises a plurality of programs and wherein the method is performed for each of said programs.

21. The method of claim 20, wherein each of said plurality of programs has a separate geographical location and the method is performed separately for each geographical location.

22. The method of claim 3, wherein said feature comprises a plurality of features, the method further comprising performing principal component analysis to reduce a number of features before said analyzing and said comparing are performed.

23. The method of claim 3, wherein said comparing comprises performing a distance measurement; and comparing the initial mark-up language document to said plurality of received mark-up language documents according to said distance measurement.

24. The method of claim 23, wherein said distance measurement is performed according to a distance metric.

25. The method of claim 1, further comprising determining at least one change to the initial mark-up language document according to said analyzed response.

26. The method of claim 25, wherein said determining said at least one change comprises one or more of determining a changed content, a changed structure or a changed metadata.

27. The method of claim 25, wherein said determining said at least one change comprises increasing phrase density of at least one phrase in said initial mark-up language document.

28. The method of claim 25, further comprising changing the initial mark-up language document with at least one change by a user; and displaying a result of said at least one change to the mark-up language document to the user.

29. The method of claim 28, wherein said displaying said result to the user comprises indicating an increase or decrease in potential rank of the mark-up language document by the internet based indexing computer program.

30. The method of claim 25, further comprising determining an effect of said at least one change on a search engine ranking of said initial mark-up language document; and comparing actual and predicted search engine rankings to determine whether said effect is expected.

31. The method of claim 30, wherein if said effect has a sufficiently great difference than an expected effect, performing said supervised training again.

32. The method of claim 1, further comprising determining one or more changes to the initial mark-up language document according to said analysis; and determining an effect on a relative rank of the initial mark-up language document of said one or more changes by said internet based indexing computer program.

33. The method of claim 32, wherein said determining said one or more changes comprises determining said one or more changes to the initial mark-up language document to increase said relative rank of the initial mark-up language document.

34. The method of claim 33, wherein said analyzing said plurality of retrieved mark-up language documents and their respective ranks according to said supervised training procedure comprises modeling behavior of the internet based indexing computer program through the internet according to said analysis of said response according to said supervised training procedure.

35. The method of claim 34, wherein said internet based indexing computer program is Google.

36. The method of claim 34, wherein said determining said one or more changes comprises determining one or more changes to one or more features selected from the group consisting of keyword specific features, non-keyword specific page features, page-specific link popularity ranking factors, usage data ranking factors and site-wide link-based ranking factors.

37. The method of claim 1, wherein said internet based indexing computer program is Google.

* * * * *